(12) United States Patent
Takata

(10) Patent No.: US 9,059,843 B2
(45) Date of Patent: Jun. 16, 2015

(54) INFORMATION PROTECTION APPARATUS, INFORMATION PROTECTION METHOD, AND STORAGE MEDIUM

(75) Inventor: Tadahiro Takata, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 320 days.

(21) Appl. No.: 13/150,345

(22) Filed: Jun. 1, 2011

(65) Prior Publication Data

US 2011/0307697 A1   Dec. 15, 2011

(30) Foreign Application Priority Data

Jun. 10, 2010 (JP) ................................. 2010-132944

(51) Int. Cl.
*H04L 9/32* (2006.01)
*H04L 9/08* (2006.01)
*G06F 21/62* (2013.01)

(52) U.S. Cl.
CPC .......... *H04L 9/0894* (2013.01); *G06F 21/6245* (2013.01); *H04L 9/0822* (2013.01); *H04L 9/3239* (2013.01)

(58) Field of Classification Search
None
See application file for complete search history.

(56) References Cited

U.S. PATENT DOCUMENTS

| | | | | |
|---|---|---|---|---|
| 6,057,872 | A  * | 5/2000 | Candelore | 725/23 |
| 7,536,726 | B2 * | 5/2009 | Feinleib et al. | 726/30 |
| 2004/0123122 | A1 | 6/2004 | Asai et al. | |
| 2006/0123025 | A1* | 6/2006 | DeMello et al. | 707/100 |
| 2006/0143462 | A1* | 6/2006 | Jacobs | 713/181 |
| 2009/0077216 | A1 | 3/2009 | Rhodes et al. | |

FOREIGN PATENT DOCUMENTS

| | | |
|---|---|---|
| JP | 2004-309737 | 11/2004 |
| JP | 2005-018725 | 1/2005 |
| JP | 2009-124346 | 6/2009 |

OTHER PUBLICATIONS

Japanese Office Action dated Feb. 12, 2014.

\* cited by examiner

*Primary Examiner* — Brandon Hoffman
(74) *Attorney, Agent, or Firm* — IPUSA, PLLC

(57) ABSTRACT

An apparatus for protecting information includes a hash value generating unit configured to identify a program file of a requester requesting information encrypted using a first hash value and to generate a second hash value of the identified program file, and a decryption unit configured to decrypt the information using the second hash value and if the information is successfully decrypted, to return the decrypted information to the requester.

12 Claims, 20 Drawing Sheets

FIG.12

| WIDGET ID | scan001 |
|---|---|
| USER ID | USER A |
| LINKED FUNCTION IDENTIFIER | scan |
| WIDGET ADDRESS | http://xxx/xxx/yyy |
| DISPLAY NAME | SCANNING |
| SCAN SETTING INFORMATION | ... |

FIG.15

| WIDGET ID | scan001 |
|---|---|
| USER ID | USER A |
| LINKED FUNCTION IDENTIFIER | scan |
| WIDGET ADDRESS | http://xxx/xxx/yyy |
| DISPLAY NAME | SCANNING |
| SCAN SETTING INFORMATION | ... |
| WIDGET RELAY URL | http://yyyyyyyyyy |

INFORMATION PROTECTION APPARATUS, INFORMATION PROTECTION METHOD, AND STORAGE MEDIUM

CROSS-REFERENCE TO RELATED APPLICATION

The present application is based upon and claims the benefit of priority of Japanese Patent Application No. 2010-132944, filed on Jun. 10, 2010, the entire contents of which are incorporated herein by reference.

BACKGROUND OF THE INVENTION

1. Field of the Invention

A certain aspect of this disclosure relates to an information protection apparatus, an information protection method, and a storage medium storing an information protection program.

2. Description of the Related Art

With the advancement of information technologies, it has become possible to process various types of information with computer programs and to transmit the processed information via a network. Such information may include "confidential information" such as personal information and trade secrets that are highly confidential and not allowed to be made public. Generally, such confidential information is protected using, for example, encryption technologies.

Encryption keys (e.g., a symmetric key used in symmetric key cryptography and a secret key used in public key cryptography) used to encrypt confidential information are also a type of confidential information that is not allowed to be made public. See, for example, Japanese Laid-Open Patent Publication No. 2004-309737.

Here, if a program for processing confidential information is tampered with or impersonated (for spoofing), the security of the confidential information is compromised. This is particularly relevant to programs that are easily downloadable via a network. Compared with programs that are protected in a secure environment, such downloadable programs can be easily tampered with and are therefore not suitable for processing confidential information. Meanwhile, it may be convenient if programs that can process confidential information are easily available via, for example, a network. To achieve this, however, it is necessary to provide a mechanism for securely protecting confidential information.

SUMMARY OF THE INVENTION

In an aspect of this disclosure, there is provided an apparatus for protecting information. The apparatus includes a hash value generating unit configured to identify a program file of a requester requesting the information encrypted using a first hash value and to generate a second hash value of the identified program file, and a decryption unit configured to decrypt the information using the second hash value and if the information is successfully decrypted, to return the decrypted information to the requester.

BRIEF DESCRIPTION OF THE DRAWINGS

FIG. 12 is a table showing exemplary widget information of a scanning widget;

FIG. 15 is a table showing an exemplary configuration of widget information of a scanning widget which is to be transmitted from a widget manager to a provider application;

DESCRIPTION OF THE PREFERRED EMBODIMENTS

Figure 1:
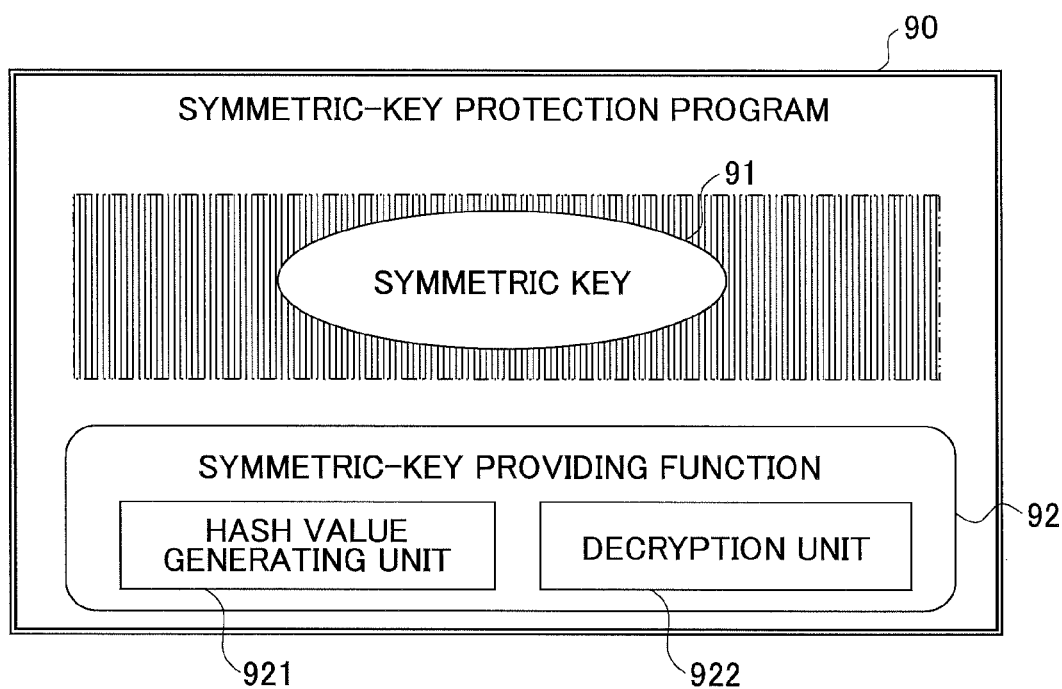
FIG. 1 is a drawing illustrating an exemplary configuration of a symmetric-key protection program according to an embodiment of the present invention.

Preferred embodiments of the present invention are described below with reference to the accompanying drawings. FIG. 1 is a drawing illustrating an exemplary configuration of a symmetric-key protection program 90 according to an embodiment of the present invention. The symmetric-key protection program 90 may be, for example, a program module such as a dynamic link library (DLL) and may include a symmetric key 91 and a symmetric-key providing function 92.

The symmetric key 91 is an encryption key used in symmetric-key cryptography. In this embodiment, it is assumed that the symmetric key 91 is information to be protected. The symmetric key 91 is encrypted and stored in the symmetric-key protection program 90. In FIG. 1, the symmetric key 91 is represented by an ellipse and a hatched rectangle surrounding the ellipse indicates that the symmetric key 91 is encrypted.

If a caller of the symmetric-key providing function 92 (i.e., a requester of the symmetric key 91) is an authorized program, the symmetric-key providing function 92 decrypts the symmetric key 91 and returns the decrypted symmetric key 91 to the program. Meanwhile, if a caller is an unauthorized program, the symmetric-key providing function 92 does not return the symmetric key 91. An authorized program or caller indicates a legitimate (or authentic) user of the symmetric key 91.

The symmetric-key providing function 92 may include a hash value generating unit 921 and a decryption unit 922. The hash value generating unit 921 generates a hash value of a calling program. The decryption unit 922 decrypts the encrypted symmetric key 91 using the generated hash value.

Figure 2:
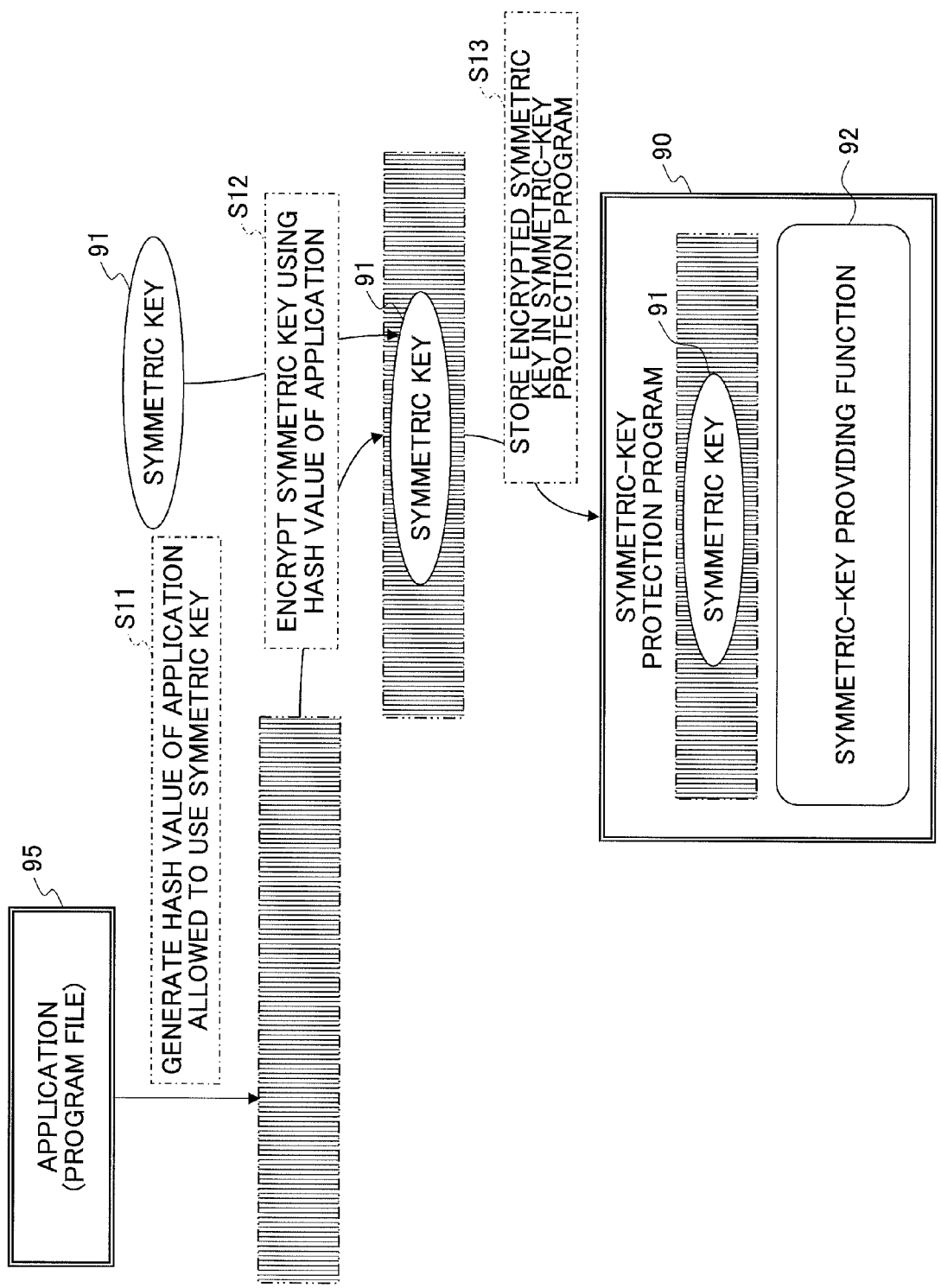
FIG. 2 is a drawing used to describe an exemplary process of generating a symmetric-key protection program.

FIG. 2 is a drawing used to describe an exemplary process of generating the symmetric-key protection program 90. In FIG. 2, an application 95 represents an authorized user of the symmetric key 91 being protected. In other words, in this example, only the application 95 is allowed to use the symmetric key 91.

In this exemplary process, a hash value of the program file (e.g., an executable file) of the application 95 is generated using a hash function (S11). Next, the symmetric key 91 is encrypted using the generated hash value (S12). Then, a program module (i.e., the symmetric-key protection program 90) including the encrypted symmetric key 91 and the symmetric-key providing function 92 is generated (S13).

The process of FIG. 2 may be performed by a program or a combination of a program and user operations.

Figure 3:
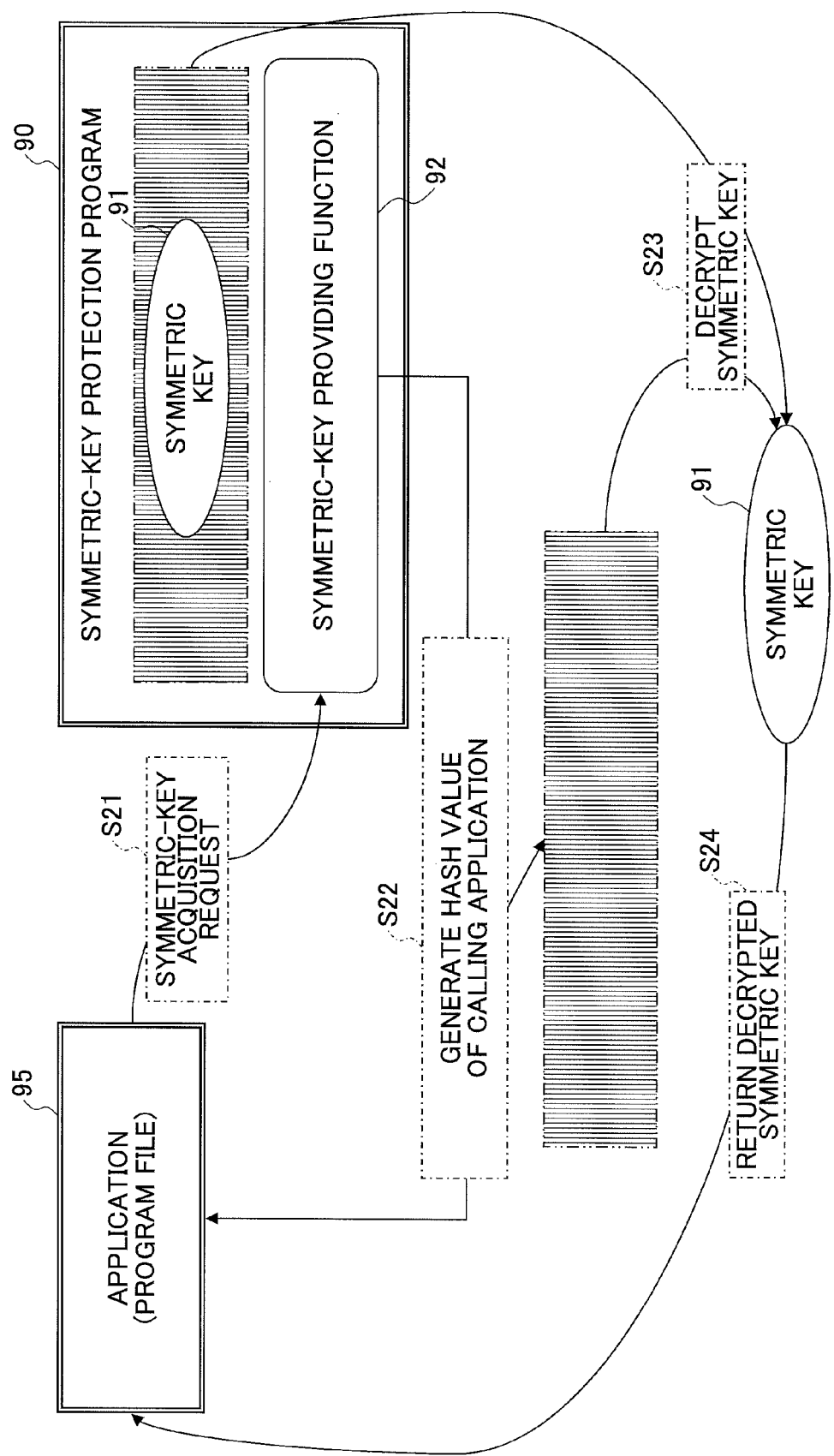
FIG. 3 is a drawing used to describe an exemplary process of providing a symmetric key to an application.

FIG. 3 is a drawing used to describe an exemplary process of providing the symmetric key 91 to the application 95.

To use the symmetric key 91, the application 95 calls the symmetric-key providing function 92 (S21). A call for the symmetric-key providing function 92 corresponds to a symmetric key acquisition request for requesting the symmetric-key protection program 90 to provide the symmetric key 91. The hash value generating unit 921 of the called symmetric-key providing function 92 identifies the program file of the application 95 and generates a hash value of the program file using a hash function (S22). The hash function used in step S22 is the same as the hash function used in step S11 of FIG. 2. In step S22, the symmetric-key providing function 92 "actively" identifies the program file of the calling application 95. That is, the pathname of the program file of the application 95 is not provided externally (i.e., from the application 95 or the caller), for example, as an argument. Instead, the symmetric-key providing function 92 obtains the pathname of the program file by making a query to a software program (e.g., an operating system) other than the application 95. If the symmetric-key providing function 92 is configured to receive the pathname as an argument, a (unauthorized) caller can specify the pathname of the program file of the (authorized) application 95 for the argument and easily impersonate the application 95. To prevent this problem, the symmetric-key providing function 92 is preferably configured to obtain the pathname of the program file of the application 95 from a software program other than the application 95. Any known method may be used for this purpose. For example, the symmetric-key providing function 92 may call a function (e.g., GetModuleFileName) in the DLL to obtain the pathname. In this case, the hash value generating unit 921 identifies the program file of the application 95 based on the obtained pathname. The symmetric-key protection program 90 is not necessarily implemented as a DLL and may be implemented in any form according to the programming language used and/or the execution environment as long as the symmetric-key protection program 90 can correctly identify a caller.

In the next step, the decryption unit 922 of the symmetric-key providing function 92 decrypts the encrypted symmetric key 91 using the hash value generated by the hash value generating unit 921 (S23). If the generated hash value is the same as the hash value used to encrypt the symmetric key 91, the symmetric key 91 is successfully decrypted. That is, if the caller of the symmetric-key providing function 92 is the application 95 that is authorized to use the symmetric key 91, the symmetric key 91 is successfully decrypted. If the symmetric key 91 is successfully decrypted, the decryption unit 922 returns (or outputs) the decrypted symmetric key 91 to the caller, i.e., the application 95 (S24).

Figure 4:
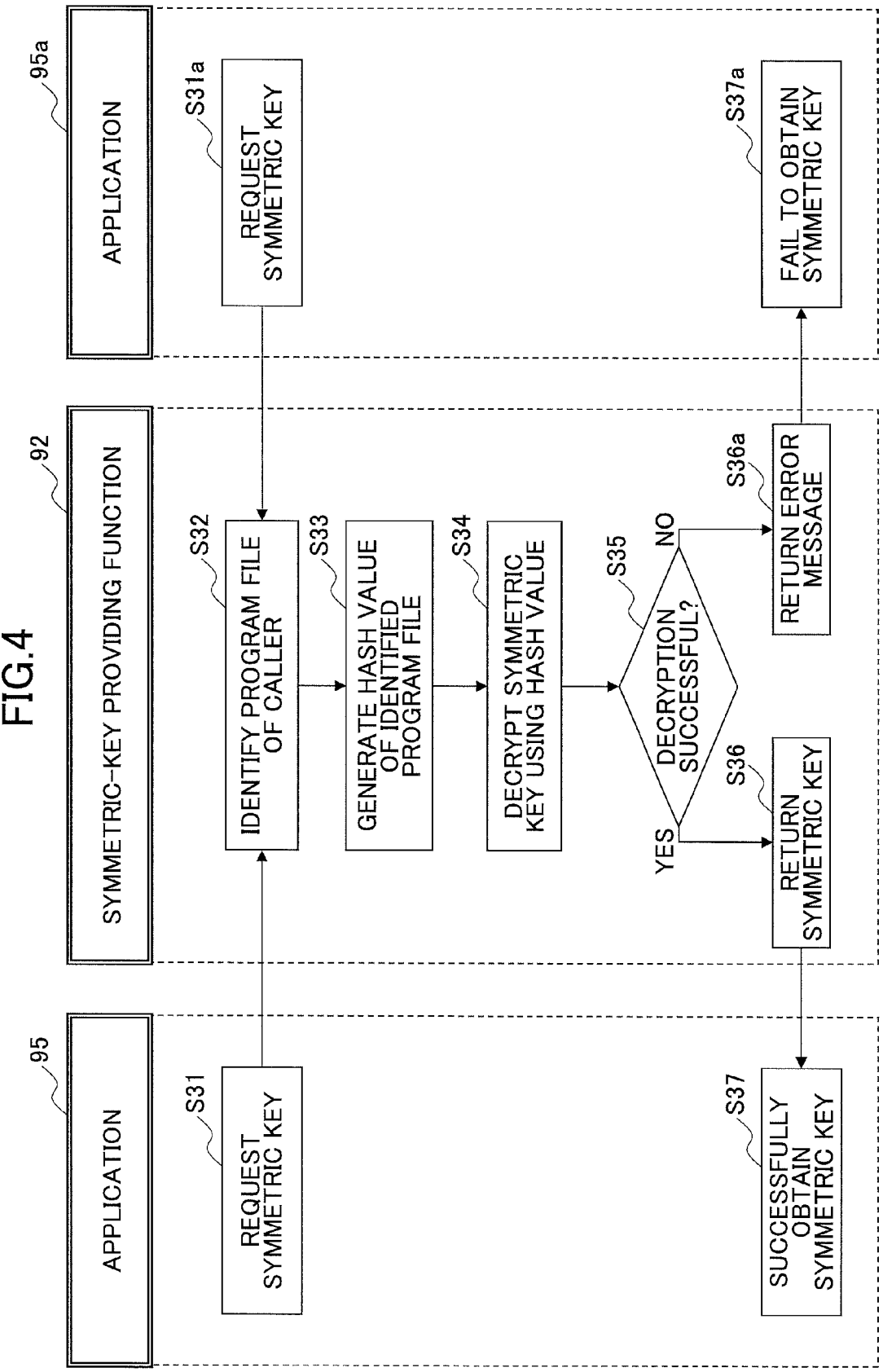
FIG. 4 is a drawing illustrating an exemplary process performed by a symmetric-key providing function.

A part of the process of FIG. 3 that is performed by the symmetric-key providing function 92 is described in more detail. FIG. 4 is a drawing illustrating an exemplary process performed by the symmetric key providing function 92.

In the exemplary process of FIG. 4, it is assumed that the symmetric-key providing function 92 receives acquisition requests for the symmetric key 91 (i.e., called) from the authorized application 95 and an unauthorized application 95a that is generated by tampering with the application 95.

When receiving an acquisition request for the symmetric key 91 (S31 or S31a), the hash value generating unit 921 of the symmetric-key providing function 92 identifies the program file of the caller (or the requester) (S32). Next, the hash value generating unit 921 generates a hash value of the identified program file (S33). Then, the decryption unit 922 decrypts the encrypted symmetric key 91 using the generated hash value (S34). In this step, when the hash value of the program file of the application 95 is used, the encrypted symmetric key 91 can be successfully decrypted. Meanwhile, when the hash value of the program file of the application 95a, which is different from the hash value of the program file of the application 95, is used, the encrypted symmetric key 91 cannot be successfully decrypted.

If the decryption of the symmetric key 91 is successful (YES in S35), the decryption unit 922 returns the decrypted symmetric key 91 to the caller, i.e., the application 95 (S36). Accordingly, the application 95 successfully obtains the symmetric key 91 (S37).

Meanwhile, when the decryption of the symmetric key 91 is not successful (NO in S35), the decryption unit 922 returns an error message to the caller, i.e., the application 95a (S36a). Accordingly, the application 95a fails to obtain the symmetric key 91 (S37a).

Thus, the symmetric-key protection program 90 of this embodiment manages the symmetric key 91 that is encrypted using the hash value of the authorized application 95. When receiving an acquisition request for the symmetric key 91 from a program file, the symmetric-key protection program 90 tries to decrypt the symmetric key 91 using a hash value of the program file. The symmetric-key protection program 90 provides the symmetric key 91 to the program file if the decryption is successful, but does not provide the symmetric key to the program file if the decryption fails.

Since the hash values of program files are basically different from each other, the above configuration makes it possible to provide the symmetric key 91 only to the application 95 that is the authorized user of the symmetric key 91. In other words, the above configuration makes it possible to prevent the application 95a, which is obtained by tampering with the application 95, from using the symmetric key 91.

The application 95 may use the symmetric key 91 to identify or authenticate itself. For example, in communications with a communication partner (i.e., another application) having the same symmetric key 91, the application 95 encrypts information with the symmetric key 91 and transmits the encrypted information to the communication partner. When receiving the information from the application 95, the communication partner decrypts the information with the symmetric key 91. If the information is successfully decrypted, the communication partner determines that the application 95 is an authentic sender since only the authorized application 95 can obtain the symmetric key 91.

Thus, the symmetric-key protection program 90 can safely manage the symmetric key 91 and makes it possible to effectively prevent safety problems in communications such as spoofing, eavesdropping, and tampering.

The symmetric-key protection program 90 may be configured to protect (or manage) symmetric keys 91 of multiple applications. In other words, the symmetric protection program 90 may be shared by multiple applications.

Figure 5:
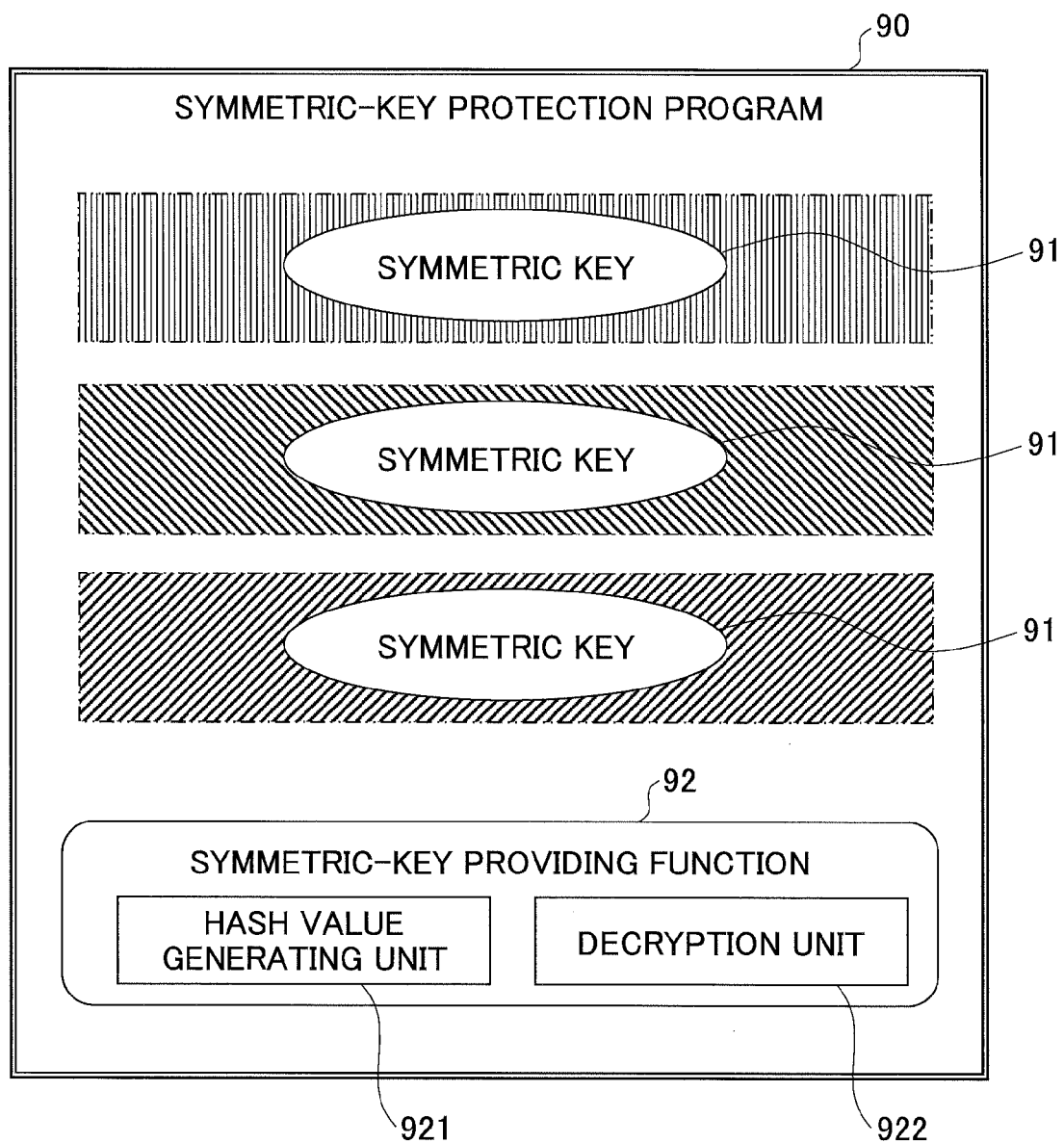
FIG. 5 is a drawing illustrating an exemplary configuration of a symmetric-key protection program for protecting symmetric keys of multiple applications.

FIG. 5 is a drawing illustrating an exemplary configuration of a symmetric-key protection program 90 for protecting symmetric keys 91 of multiple applications 95. In the example of FIG. 5, the symmetric-key protection program 90 includes three encrypted symmetric keys 91 for the applications 95. Different hatching patterns of rectangles surrounding the symmetric keys 91 indicate different hash values used to encrypt the symmetric keys 91. Accordingly, the hash values of the program files of the applications 95 are different from each other.

When the symmetric-key protection program 90 stores multiple symmetric keys 91, the symmetric-key providing function 92 may be configured to try to decrypt each of the symmetric keys 91 using the hash value of the program file of the application program 95 calling the symmetric-key providing function 92, and to return one of the symmetric keys 91 that is successfully decrypted. If decryption of all the symmetric keys 91 fails, the symmetric-key providing function 92 may return an error message.

Alternatively, the encrypted symmetric keys 91 may be stored in the symmetric-key protection program 90 in association with identification information of the applications 95. For example, the identification information may be the file names of the program files of the applications 95. In this case, the symmetric-key providing function 92 may obtain the identification information of a calling application and decrypt one of the symmetric keys 91 corresponding to the obtained identification information. The symmetric keys 91 stored in the symmetric-key protection program 90 may be the same or different from each other depending on the purpose of the symmetric keys 91.

Next, an exemplary information processing system using the symmetric-key protection program 90 is described.

Figure 6:
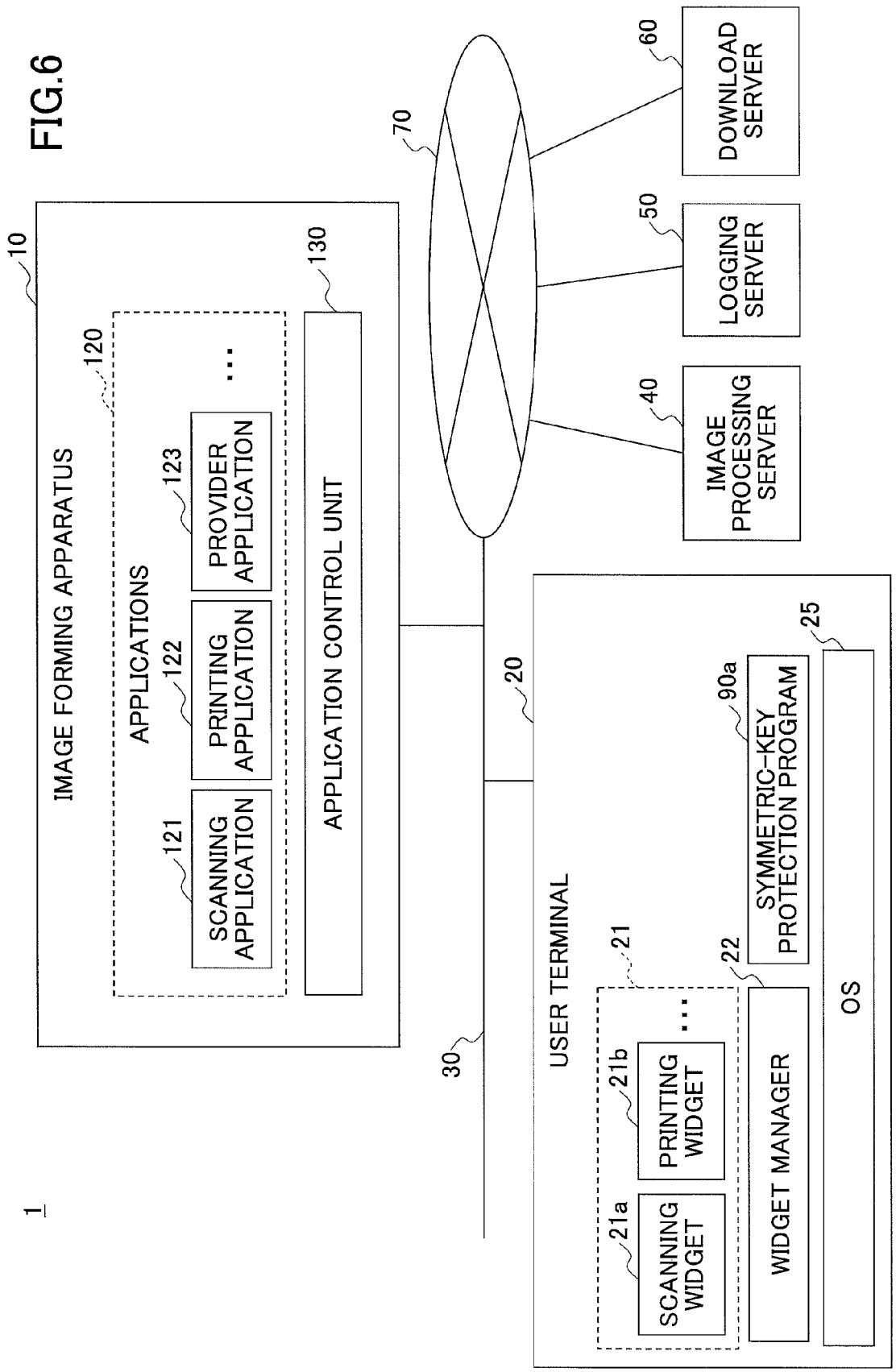
FIG. 6 is a drawing illustrating an exemplary configuration of an information processing system according to an embodiment of the present invention.

FIG. 6 is a drawing illustrating an exemplary configuration of an information processing system 1 according to an embodiment of the present invention. As illustrated in FIG. 6, the information processing system 1 includes at least one image forming apparatus 10 and at least one user terminal 20 that are connected via a (wired or wireless) network 30 such as a local area network (LAN). The information processing system 1 further includes an image processing server 40, a logging server 50, and a download server 60 that are connected to the user terminal 20 via a wide area network 70 such as the Internet.

The image forming apparatus 10 may be, for example, a multifunction peripheral including multiple functions such as printing, scanning, copying, and facsimile transmission and reception. Alternatively, the image forming apparatus 10 may be implemented by an apparatus such as a printer, a scanner, a copier, or a facsimile machine having one or more functions. In this embodiment, it is assumed that the image forming apparatus 10 includes at least a hardware component providing a scanning function.

The user terminal 20 may be implemented by any type of device that can store and execute a software program and has a communication function. For example, the user terminal 20 may be implemented by a desktop personal computer (PC), a notebook PC, a personal digital assistance (PDA), or a cell phone.

The image processing server 40 may be a computer that provides a Web service for converting image data via the network 70.

The logging server 50 may be a computer that records and stores logs of processes performed by a widget manager 22 of the user terminal 20.

The download server 60 may be a computer that distributes widgets 21 (described later) and the widget manager 22 via the network 70. In other words, the download server 60 allows other apparatuses (e.g., the user terminal 20) to download the widgets 21 and the widget manager 22.

An exemplary software configuration of the user terminal 20 is described below. As illustrated in FIG. 6, the user terminal 20 includes a scanning widget 21a, a printing widget 21b, a widget manager 22, a symmetric-key protection program 90a, and an operating system (OS) 25.

The scanning widget 21a and the printing widget 21b are examples of application programs that are collectively called "widgets 21" in this embodiment. In recent years, simple application programs are often, called widgets or gadgets. In this embodiment, application programs that can be easily installed and used are called the widgets 21 and the term "widget" does not limit the technical scope of the application programs. The widgets 21 of this embodiment provide functions (e.g., perform process flows or workflows) by using services available on the network and/or in the user terminal 20.

The scanning widget 21a requests the image forming apparatus 10 to scan a document to obtain image data and transfers the obtained image data to the image processing server 40. The printing widget 21b requests the image forming apparatus 10 to print document data stored in the user terminal 20.

The widget manager 22 provides a framework for the widgets 21 and interfaces communications between the widgets 21 and the image forming apparatus 10. Each of the widgets 21 may include an interface and a protocol defined by the widget manager 22. In other words, the widgets 21 of this embodiment are application programs that operate in cooperation with the widget manager 22.

In this embodiment, it is assumed that the widgets 21 and the widget manager 22 are downloaded from the download server 60 and installed in the user terminal 20.

Also in this embodiment, it is assumed that the symmetric-key protection program 90a protects a symmetric key 91a to be used by the widget manager 22. The symmetric key 91a is encrypted using a hash value of the program file of the widget manager 22 and stored in the symmetric-key protection program 90a. The symmetric-key protection program 90a may be downloaded from (or distributed by) the download server 60 together with the widget manager 22. The functional configuration of the symmetric-key protection program 90a is substantially the same as the symmetric-key protection program 90 of FIG. 1. However, a symmetric key (the symmetric key 91a) to be protected and a hash value used for encryption by the symmetric-key protection program 90a are different from those of the symmetric-key protection program 90.

The OS 25 is an operating system. Software programs in the user terminal 20 run as processes or threads on the OS 25.

An exemplary software configuration of the image forming apparatus 10 is described below. As illustrated in FIG. 6, the image forming apparatus 10 may include applications 120 and an application control unit 130 as software components. The applications 120 are programs that perform jobs requested by the user. In the exemplary configuration illustrated in FIG. 6, the applications 120 include a scanning application 121, a printing application 122, and a provider application 123. The scanning application 121 performs a scan job. The printing application 122 performs a print job. The provider application 123 performs a process to enable collaboration between the image forming apparatus 10 and the widgets 21 (precisely speaking, the widget manager 22).

The application control unit 130 controls the applications 120. For example, the application control unit 130 switches active applications 120 according to instructions from the user. An active application 120 indicates one of the applications 120 the operation screen of which is currently displayed on an operations panel 15 (see FIG. 7) of the image forming apparatus 10 (i.e., one of the applications 120 that is currently operable via the operations panel 15).

Figure 7:
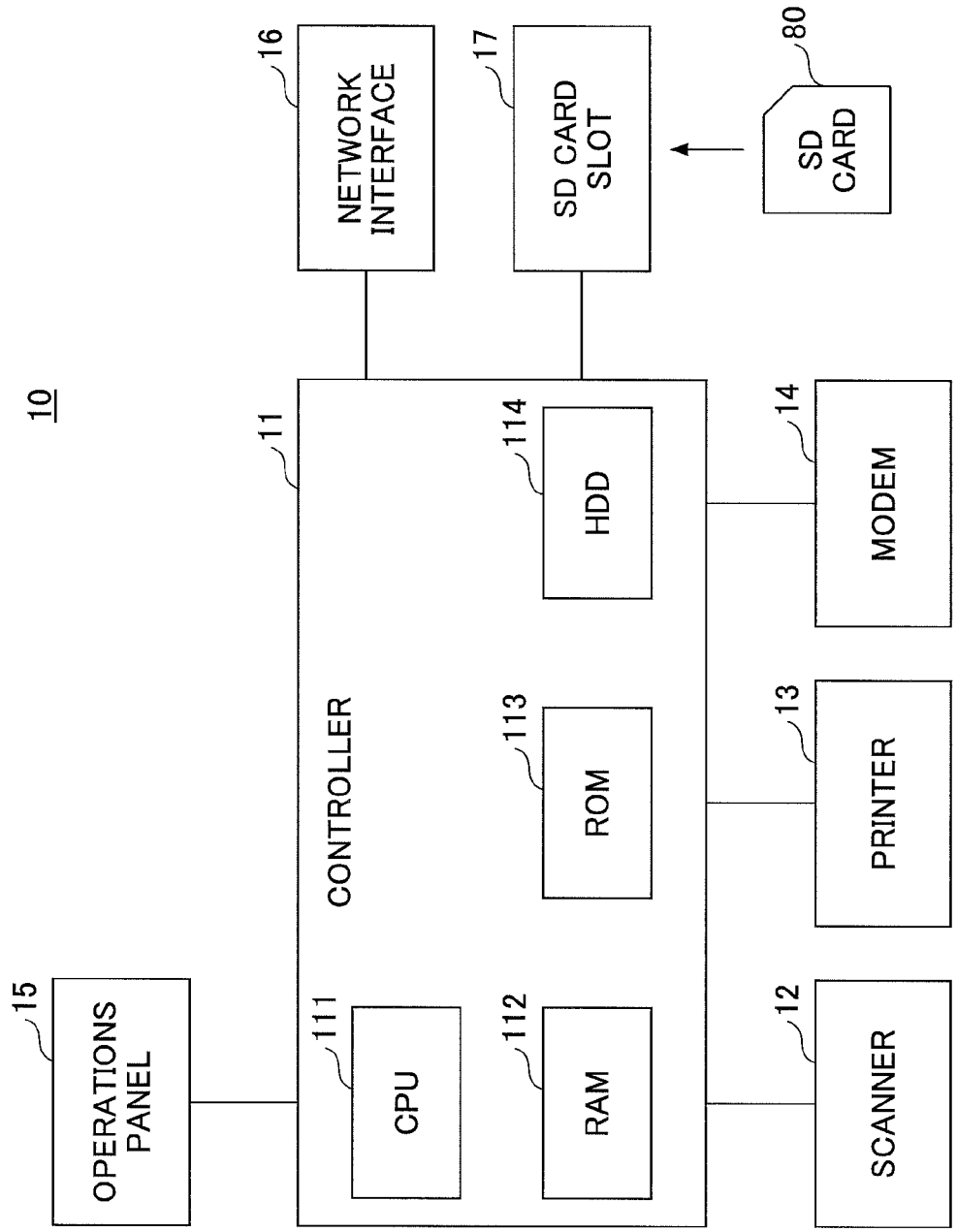
FIG. 7 is a block diagram illustrating an exemplary hardware configuration of an image forming apparatus.

Hardware configurations of the image forming apparatus 10 and the user terminal 20 are described below. FIG. 7 is a block diagram illustrating an exemplary hardware configuration of the image forming apparatus 10 of this embodiment. As illustrated in FIG. 7, the image forming apparatus 10 may include, as hardware components, a controller 11, a scanner 12, a printer 13, a modem 14, the operations panel 15, a network interface 16, and an SD (secure digital) card slot 17.

The controller 11 may include a CPU 111, a RAM 112, a ROM 113, and an HDD 114. The ROM 113 stores, for example, programs and data used by the programs. The RAM 112 is used, for example, as a storage area into which programs are loaded and as a work area for the loaded programs. The CPU 111, for example, executes the programs loaded into the RAM 112 to implement various functions. The HDD 114 stores, for example, programs and data used by the programs.

The scanner 12 is hardware for scanning a document to obtain image data. The printer 13 is hardware for printing print data on a recording medium such as paper. The modem 14 is hardware for connecting the image forming apparatus 10 to a telephone line and is used to send and receive image data for facsimile communications. The operations panel 15 is hardware including an input unit such as buttons for receiving user inputs and a display unit such as a liquid crystal display panel. The network interface 16 is hardware for connecting the image forming apparatus 10 to a (wired or wireless) network such as a LAN. The SD card slot 17 reads, for example, programs stored in an SD card 80. Thus, with the image forming apparatus 10 of this embodiment, in addition to the programs stored in the ROM 113, programs stored in the SD card 80 can be loaded into the RAM 112 and executed. Instead of the SD card 80, any other storage medium (e.g., a CD-ROM or a universal serial bus (USB) memory) may be used for this purpose. That is, a storage medium connectable to the image forming apparatus 10 is not limited to the SD card 80. When a storage medium other than the SD card 80 is used, the SD card slot 17 may be replaced with a hardware component corresponding to the storage medium used.

Figure 8:
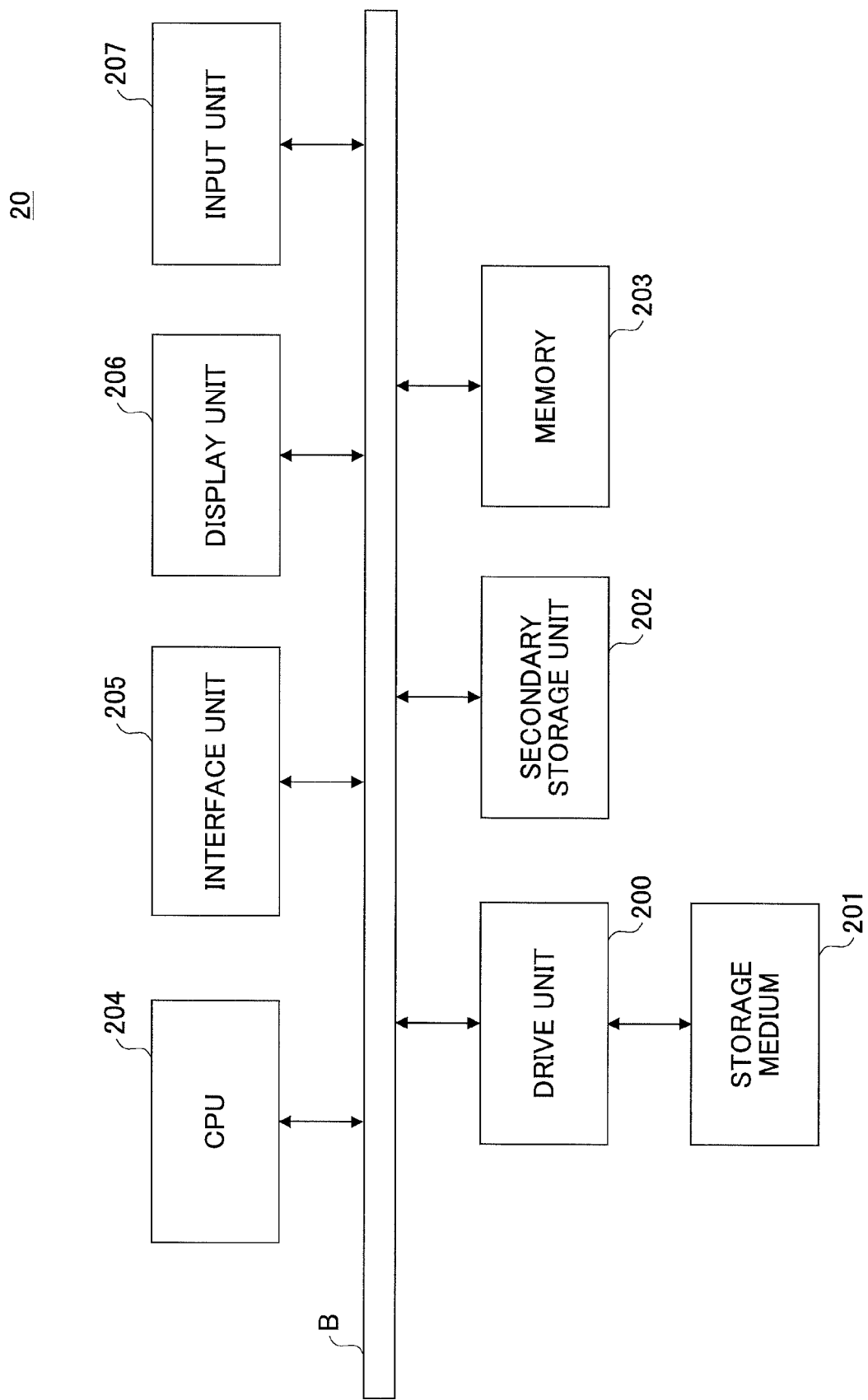
FIG. 8 is a block diagram illustrating an exemplary hardware configuration of a user terminal.

FIG. 8 is a block diagram illustrating an exemplary hardware configuration of the user terminal 20. As illustrated in FIG. 8, the user terminal 20 may include a drive unit 200, a secondary storage unit (storage device) 202, a memory 203, a CPU 204, an interface unit 205, a display unit 206, and an input unit 207 that are connected to each other via a bus B.

Programs for implementing various processes at the user terminal 20 may be provided via a storage medium 201 such as a CD-ROM or a memory card. When the storage medium 201 storing programs is mounted on the drive unit 200, the programs are read by the drive unit 200 from the storage medium 201 and are installed in the secondary storage unit 202. The programs may not necessarily be installed from the storage medium 201, but may instead be downloaded via a network from another computer. The secondary storage unit 202 stores the installed programs and other necessary files and data.

The memory 203 temporarily stores programs retrieved from the secondary storage unit 202 when the programs are executed. The CPU 204 implements functions of the user terminal 20 according to the programs temporarily stored in the memory 203. The interface unit 205 connects the user terminal 20 to a network. The display unit 206 displays, for example, graphical user interfaces (GUI) output by the programs. The input unit 207 includes, for example, a keyboard, a mouse, and/or buttons for receiving user inputs.

Figure 9:
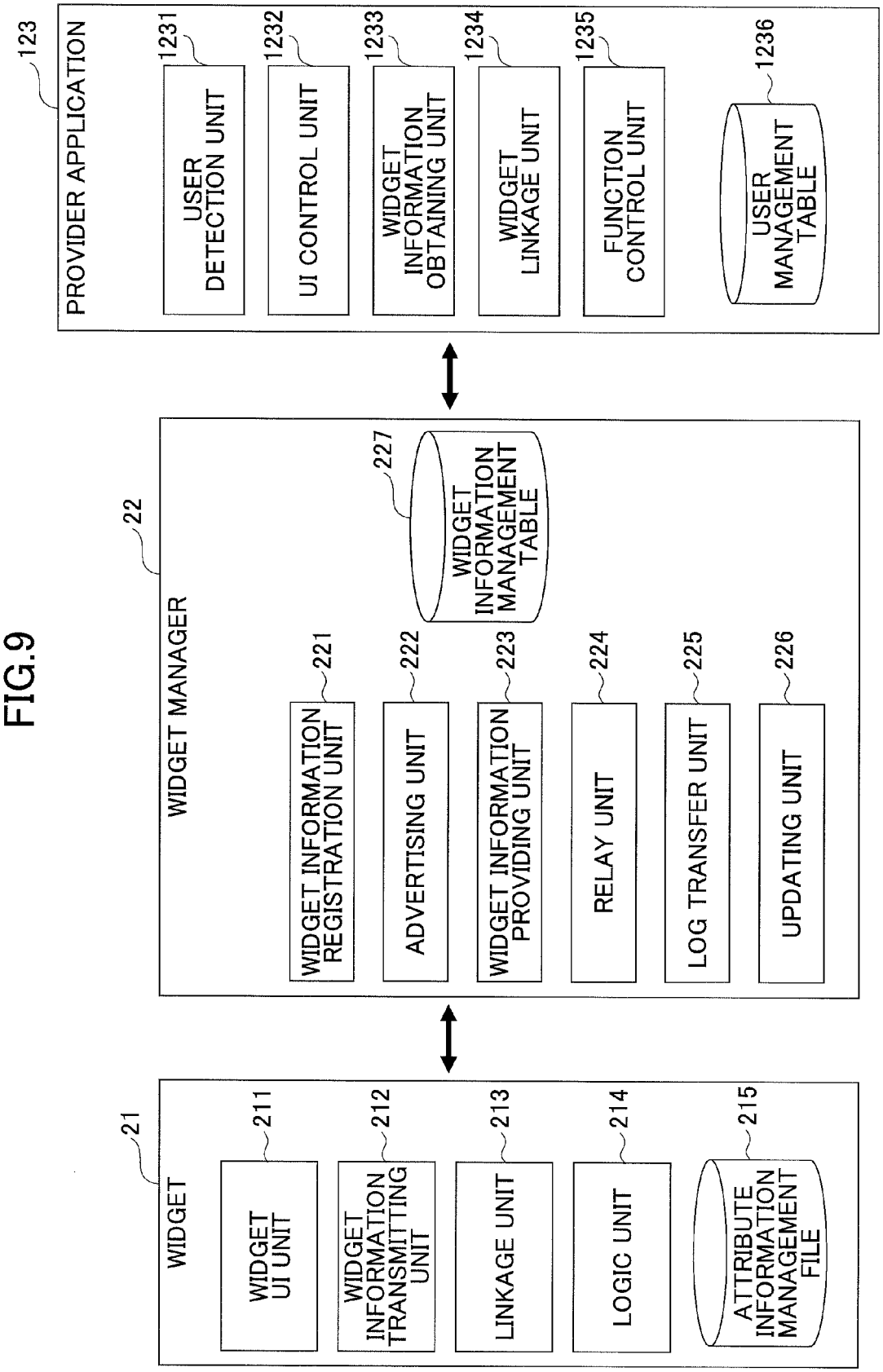
FIG. 9 is a block diagram illustrating exemplary functional configurations of a widget, a widget manager, and a provider application.

The widget 21, the widget manager 22, and the provider application 123 are described below in more detail. FIG. 9 is a block diagram illustrating exemplary functional configurations of the widget 21, the widget manager 22, and the provider application 123.

As illustrated in FIG. 9, the widget 21 may include a widget UI unit 211, a widget information transmitting unit 212, a linkage unit 213, a logic unit 214, and an attribute information management file 215.

The widget UI unit 211 displays various screens related to the widget 21 on the display unit 206 of the user terminal 20. The widget information transmitting unit 212 transmits a widget information registration request requesting registration of widget information to the widget manager 22 when the widget 21 is started. The widget information includes information necessary to execute the widget 21. The linkage unit 213 controls communications (e.g., transmission and reception of information) with the widget manager 22. The attribute information management file 215 contains configuration information of the widget 21. The logic unit 214 implements functions unique to the widget 21. For example, the logic unit 214 of the scanning widget 21a performs a process for transferring scanned image data to the image processing server 40.

The widget manager 22 may include a widget information registration unit 221, an advertising unit 222, a widget information providing unit 223, a relay unit 224, a log transfer unit 225, an updating unit 226, and a widget information management table 227.

The widget information registration unit 221 receives the widget information registration request together with the widget information from the widget 21 and stores the widget information in the widget information management table 227. The widget information management table 227 stores sets of widget information of the widgets 21 running on the user terminal 20 and is present, for example, in the secondary storage unit 202 of the user terminal 20.

The advertising unit 222 advertises (broadcasts or multicasts), for example, a user ID contained in the widget information received by the widget information registration unit 221 via the network. The advertisement is issued for each user (each user ID). Accordingly, the advertisement issued by the advertising unit 222 is used to report to the image forming apparatus 10 new entry of a user allowed to use one or more widgets 21. Alternatively, the advertisement may be issued for each set of widget information. In this case, the image forming apparatus 10 may be configured to combine or remove duplicate advertisements issued for the same user.

In response to a request from the image forming apparatus 10, the widget information providing unit 223 provides (transmits) the widget information registered in the widget information management table 227 to the image forming apparatus 10. The relay unit 224 relays communications between the widget 21 and the provider application 123. The log transfer unit 225 transfers logs of processes performed by the widget manager 22 to the logging server 50 at predetermined timing. The updating unit 226 automatically updates the widget manager 22 when, for example, the widget manager 22 is upgraded.

The provider application 123 may include a user detection unit 1231, a UI control unit 1232, a widget information obtaining unit 1233, a widget linkage unit 1234, a function control unit 1235, and a user management table 1236.

The user detection unit 1231 detects a user allowed to use the widget 21 based on an advertisement issued by the widget manager 22 and registers, for example, a user ID contained in the advertisement in the user management table 1236. The user management table 1236 is used to manage a list of users who are allowed to use the widgets 21 on the network.

The UI control unit 1232 receives user inputs for operating the widgets 21. Thus, although the widgets 21 are stored in the user terminal 20, they can also be operated by using the operations panel 15 of the image forming apparatus 10. The widget information obtaining unit 1233 obtains, from the widget manager 22, the widget information of the widgets 21 that belong to a user (user ID) selected from the users (user IDs) registered in the user management table 1236. The widget linkage unit 1234 controls communications with the widget manager 22. The function control unit 1235 controls execution of functions requested by the widgets 21.

Figure 10:
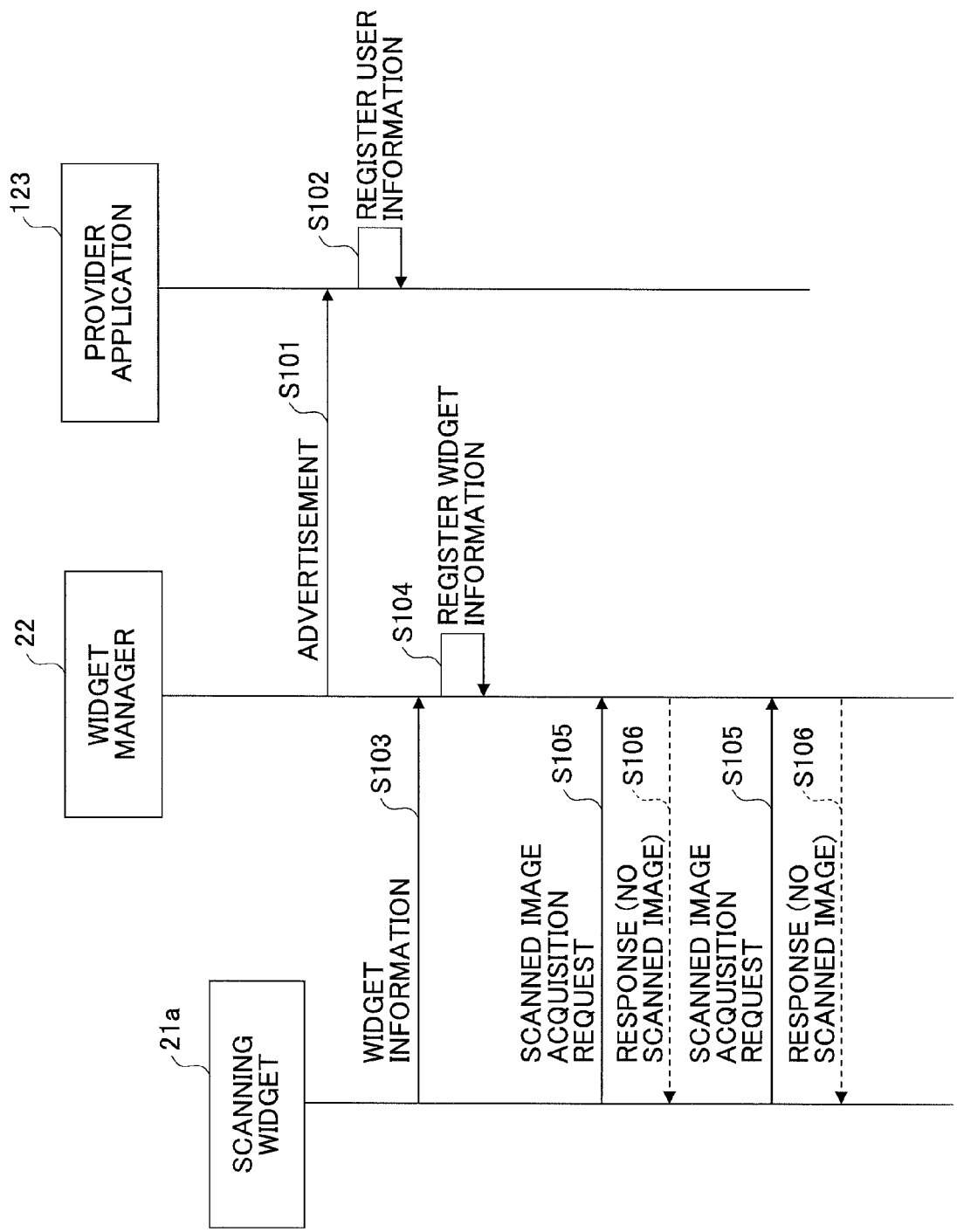
FIG. 10 is a sequence chart showing a process performed when a widget manager and a scanning widget are started.

Exemplary processes in the information processing system 1 are described below. FIG. 10 is a sequence chart showing a process performed when the widget manager 22 and the scanning widget 21a are started.

When the widget manager 22 is started by the user or automatically, the advertising unit 222 of the widget manager 22 transmits (or issues) an advertisement (or user information) including a user ID and a widget information URL (uniform resource locator) for obtaining the widget information via the network 30 (S101). The user ID and the widget information URL may be stored beforehand in, for example, the secondary storage unit 202 as the configuration information of the widget manager 22. The widget information URL is unique to the widget manager 22 (i.e., to each user terminal 20). Therefore, the provider application 123 of the image forming apparatus 10 can identify the widget manager 22 of a user terminal 20 based on the widget information URL.

When receiving the advertisement, the user detection unit 1231 of the provider application 123 registers the user ID and the widget information URL (user information) contained in the advertisement in the user management table 1236 (S102).

Figure 11:
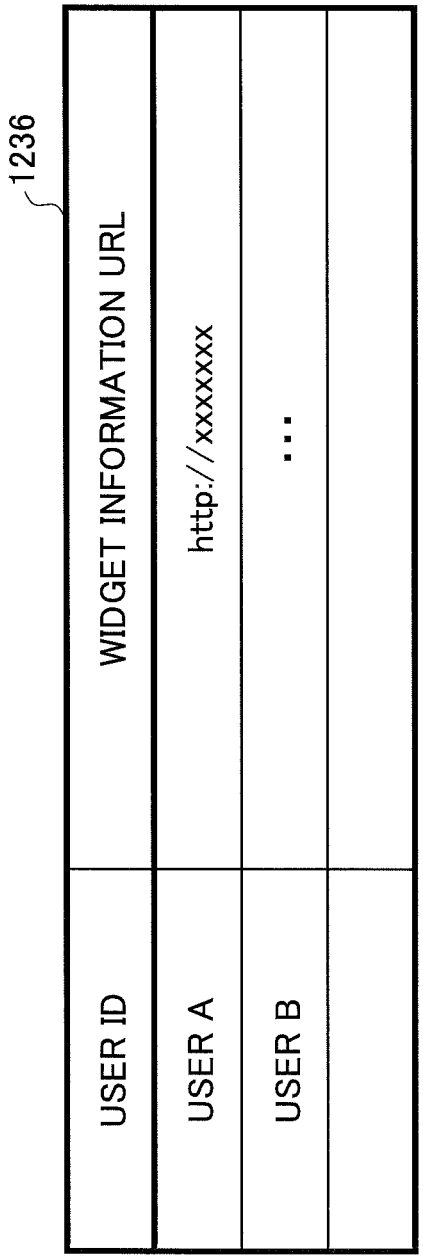
FIG. 11 is a table showing an exemplary configuration of a user management table.

FIG. 11 is a table showing an exemplary configuration of the user management table 1236. As shown in FIG. 11, the user management table 1236 stores user IDs in association with widget information URLs. In this example, records for user A and user B are registered in the user management table 1236. The user management table 1236 is stored, for example, in the HDD 114.

Next, at the user terminal 20, the scanning widget 21a is started in response to, for example, a user input. When the scanning widget 21a is started, the widget information transmitting unit 212 of the scanning widget 21a obtains the widget information from the attribute information management file 215, and transmits a widget information registration request together with the widget information to the widget manager 22 (S103). The widget information of the scanning widget 21a corresponds to a scanning request for requesting the image forming apparatus 10 to scan an image.

FIG. 12 is a table showing exemplary widget information of the scanning widget 21a. As shown in FIG. 12, the widget information of the scanning widget 21a includes a widget ID, a user ID, a linked function identifier, a widget address, a display name, and scan setting information.

The widget ID is identification information for uniquely identifying the scanning widget 21a. The user ID is identification information for identifying the user of the scanning widget 21a. The linked function identifier is used to identify a function that is necessary for the image forming apparatus 10 to collaborate with the scanning widget 21a. In other words, the linked function identifier indicates a function of the image forming apparatus 10 that is to be used by the scanning widget 21a. Examples of linked function identifiers include "print" indicating a printing function and "scan" indicating a scanning function. The scanning widget 21a uses the scanning function of the image forming apparatus 10, and therefore "scan" is specified as the linked function identifier in FIG. 12. The widget address is identification information (e.g., a URL) for uniquely identifying the scanning widget 21a in network communications. The display name is a character string to be displayed as the name of the scanning widget 21a.

The scan setting information includes parameters such as a resolution and a color mode (e.g., color or monochrome) regarding the scanning function.

The widget information transmitted from the widget information transmitting unit 212 of the scanning widget 21a is received by the widget information registration unit 221 of the widget manager 22. The widget information registration unit 221 registers the received widget information in the widget information management table 227 (S104).

After transmitting the widget information, the scanning widget 21a performs polling to determine whether an image has been scanned by the image forming apparatus 10 to obtain image data and waits for reception of the image data. More specifically, the linkage unit 213 of the scanning widget 21a transmits a scanned image acquisition request for requesting the image data (the scanned image) to the relay unit 224 of the widget manager 22 (S105). The relay unit 224 returns a response to the scanned image acquisition request (S106). Since the image has not been scanned at this stage, the relay unit 224 returns a response indicating that there is no scanned image. The linkage unit 213 repeatedly transmits the scanned image acquisition request at predetermined intervals (S105). The scanned image acquisition request may include the widget ID.

After starting the scanning widget 21a on the user terminal 20, the user moves to a location where the image forming apparatus 10 is installed to use the scanning widget 21a. Here, the same advertisement may be transmitted to multiple image forming apparatuses 10 connected to the network 30. In this case, the user detection units 1231 of the multiple image forming apparatuses 10 receive the advertisement and register the user ID and the widget information URL in the user management tables 1236. Accordingly, in this case, the user can use the scanning widget 21a on any one of the image forming apparatuses 10.

Figure 13:
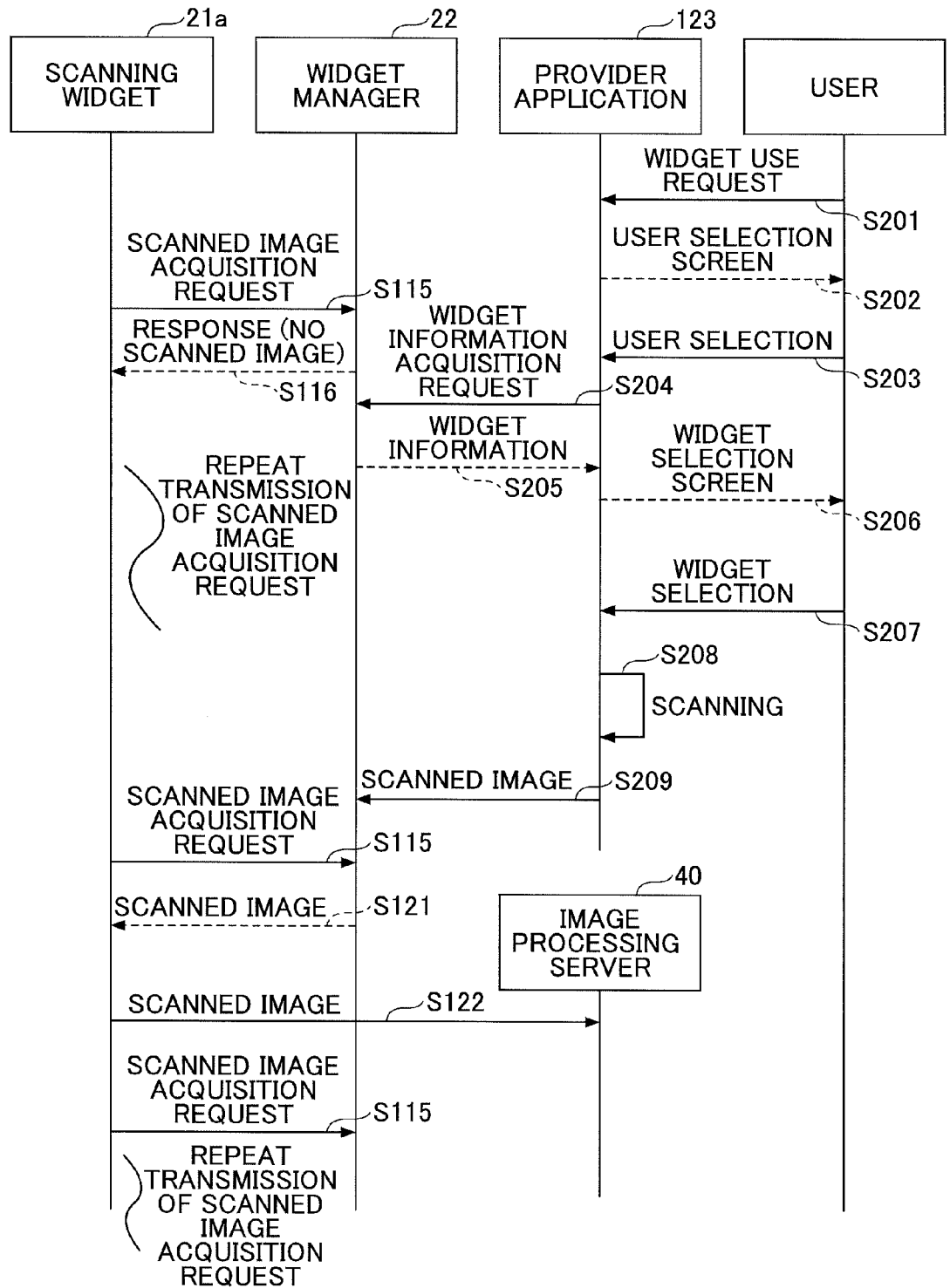
FIG. 13 is a sequence chart showing a process performed when a scanning widget is executed.

Next, a process performed in response to user operations on the image forming apparatus 10 is described. FIG. 13 is a sequence chart showing a process performed when the scanning widget 21a is executed.

When the user inputs a request (widget use request) to use the provider application 123 via the operations panel 15 of the image forming apparatus 10, the application control unit 120 causes the provider application 123 to transition into an active state (S201). After the transition into the active state, the UI control unit 1232 of the provider application 123 displays a user selection screen on the operations panel 15 based on information registered in the user management table 1236 (S202).

Figure 14:
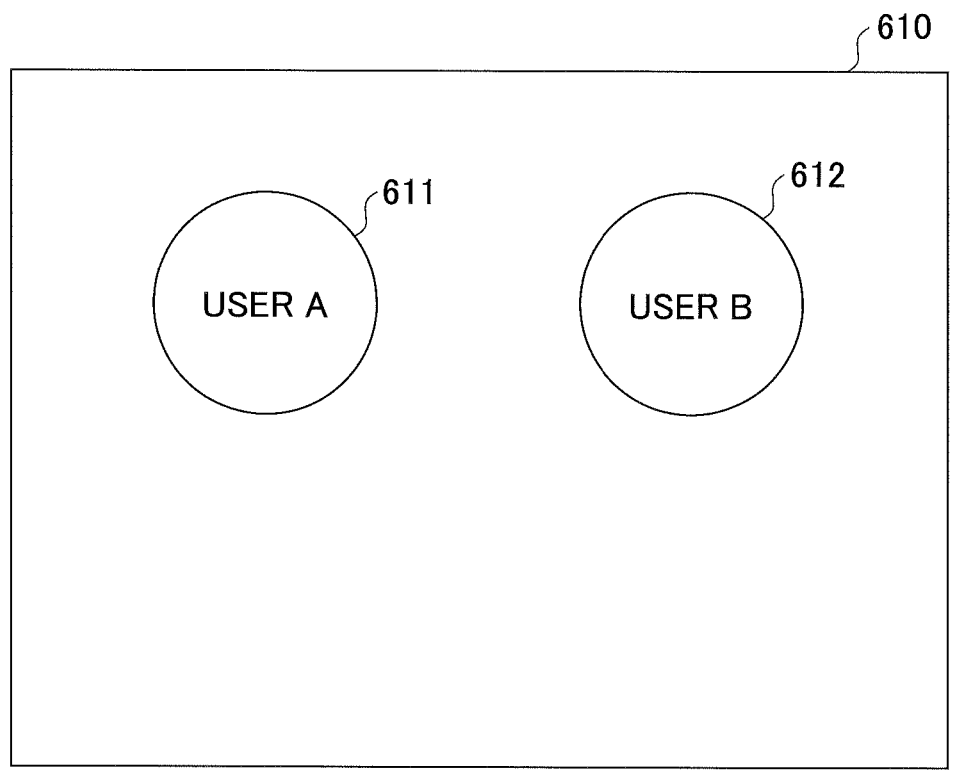
FIG. 14 is a drawing illustrating an exemplary user selection screen.

FIG. 14 illustrates an exemplary user selection screen 610. The user selection screen 610 includes buttons for respective user IDs. In this example, a button 611 for a user A and a button 612 for a user B are displayed on the user selection screen 610.

On the user selection screen 610, the user selects and presses one of the buttons corresponding to the user ID of the user (S203). Then, the widget information obtaining unit 1233 obtains the widget information URL associated with the user ID corresponding to the pressed button from the user management table 1236. Here, user authentication may be performed based on the user ID corresponding to the pressed button and the subsequent process may be performed only when the user is successfully authenticated.

Next, the widget information obtaining unit 1233 transmits a widget information acquisition request for requesting the widget information to the obtained widget information URL (S204). The widget information acquisition request is received by the widget information providing unit 223 of the widget manager 22. In response, the widget information providing unit 223 obtains sets of widget information registered in the widget information management table 227 and transmits the sets of widget information to the provider application 123 (S205). Prior to the transmission of the sets of the widget information, the widget information providing unit 223 generates URLs (hereafter called widget relay URLs) that are unique to the respective widgets 21 (or the sets of widget information). The widget information relay URLs are used to relay communications between the provider application 123 and the widgets 21. The widget information providing unit 223 attaches the widget relay URLs to the sets of widget information of the corresponding widgets 21 and transmits the sets of widget information with the widget relay URLs to the provider application 123. For example, the widget information transmitted in step S205 may have a configuration as shown in FIG. 15.

FIG. 15 is a table showing an exemplary configuration of the widget information of the scanning widget 21*a* which is transmitted from the widget manager 22 to the provider application 123.

The widget information shown in FIG. 15 includes the widget relay URL in addition to the information items shown in FIG. 12. In step S205, sets of widget information as shown in FIG. 15 are transmitted. Needless to say, there is a case where only one set of widget information is transmitted.

Next, the UI control unit 1232 of the provider application 123 stores the received sets of widget information in the RAM 112 and displays a screen (widget selection screen) based on the sets of widget information (S206). The widget selection screen includes a list of widgets 21 available for the user.

Figure 16:
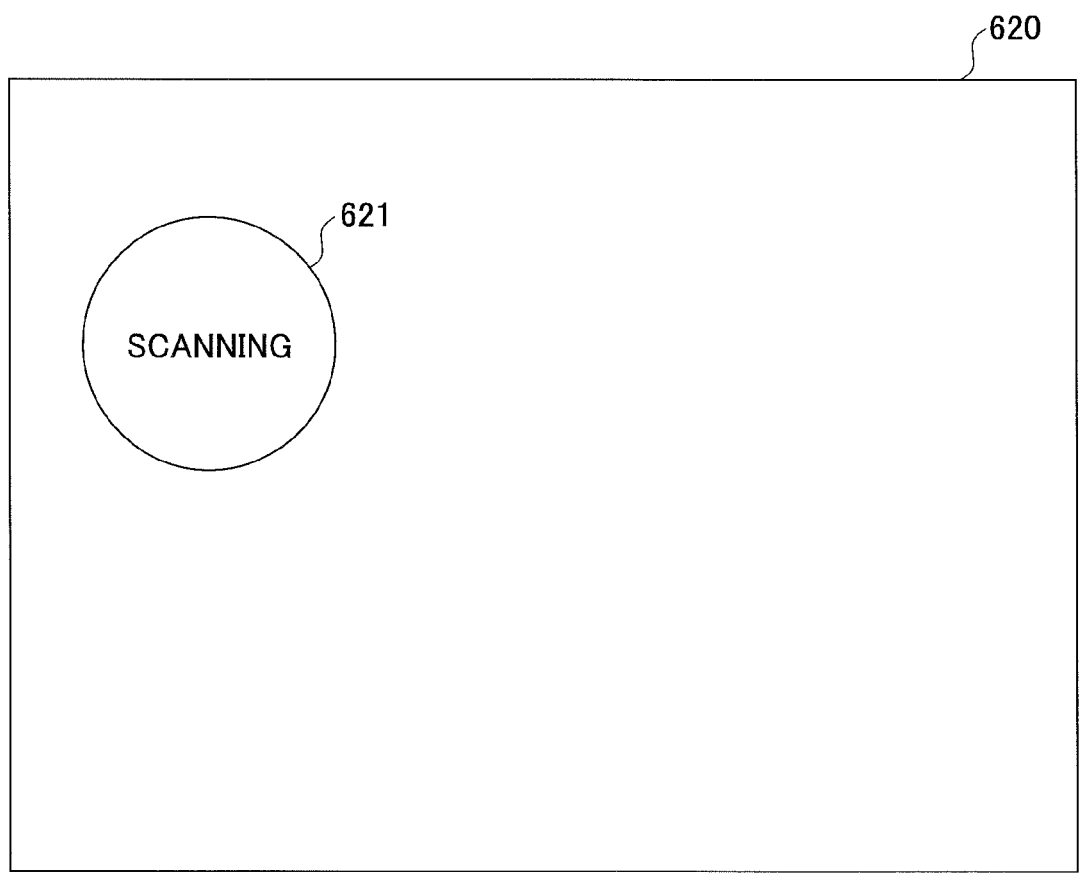
FIG. 16 is a drawing illustrating an exemplary widget selection screen.

FIG. 16 is a drawing illustrating an exemplary widget selection screen 620. On the widget selection screen 620, a button 621 corresponding to the scanning widget 21*a* is displayed. Here, if widgets 21 (e.g., the printing widget 21*b*) other than the scanning widget 21*a* have also been started on the user terminal 20, the widget information of the other widgets 21 are also transmitted to the provider application 123. In this case, buttons corresponding to the other widgets 21 are also displayed on the widget selection screen 620.

When a document is set on the image forming apparatus 10 and the button 621 corresponding to the scanning widget 21*a* is selected on the widget selection screen 620 (S207), the widget linkage unit 1234 of the provider application 123 determines to perform a scanning process based on the linked function identifier (in this example, "scan") in the widget information (hereafter called current widget information) corresponding to the selected button 621. Then, the widget linkage unit 1234 requests the function control unit 1235 to perform the scanning process.

The function control unit 1235 controls the scanning process based on the scan setting information in the current widget information (S208). More specifically, the function control unit 1235 causes the scanner 12 to scan the document set on the image forming apparatus 10 to obtain a scanned image (image data) and outputs the scanned image to the widget linkage unit 1234. For example, the scanned image may be generated in a joint photographic experts group (JPEG) format, a tagged image file format (TIFF), or a portable document format (PDF).

Next, the widget linkage unit 1234 transmits the scanned image to the widget relay URL in the current widget information (S209). The scanned image transmitted to the widget relay URL is received by the relay unit 224 of the widget manager 22. When receiving a scanned image acquisition request from the scanning widget 21*a* corresponding to the widget relay URL (S115) after the scanned image is received, the relay unit 224 transfers the scanned image to the linkage unit 213 of the scanning widget 21*a* (S121).

When receiving the scanned image, the linkage unit 213 inputs the scanned image to the logic unit 214. The logic unit 214 transfers the scanned image to the image processing server 40 (S122). The image processing server 40 performs a predetermined process on the transferred scanned image.

In the process described with reference to FIG. 13, the symmetric-key protection program 90*a* may be used to prove the authenticity of the sender of the scanned image transmitted to the image processing server 40.

Figure 17:
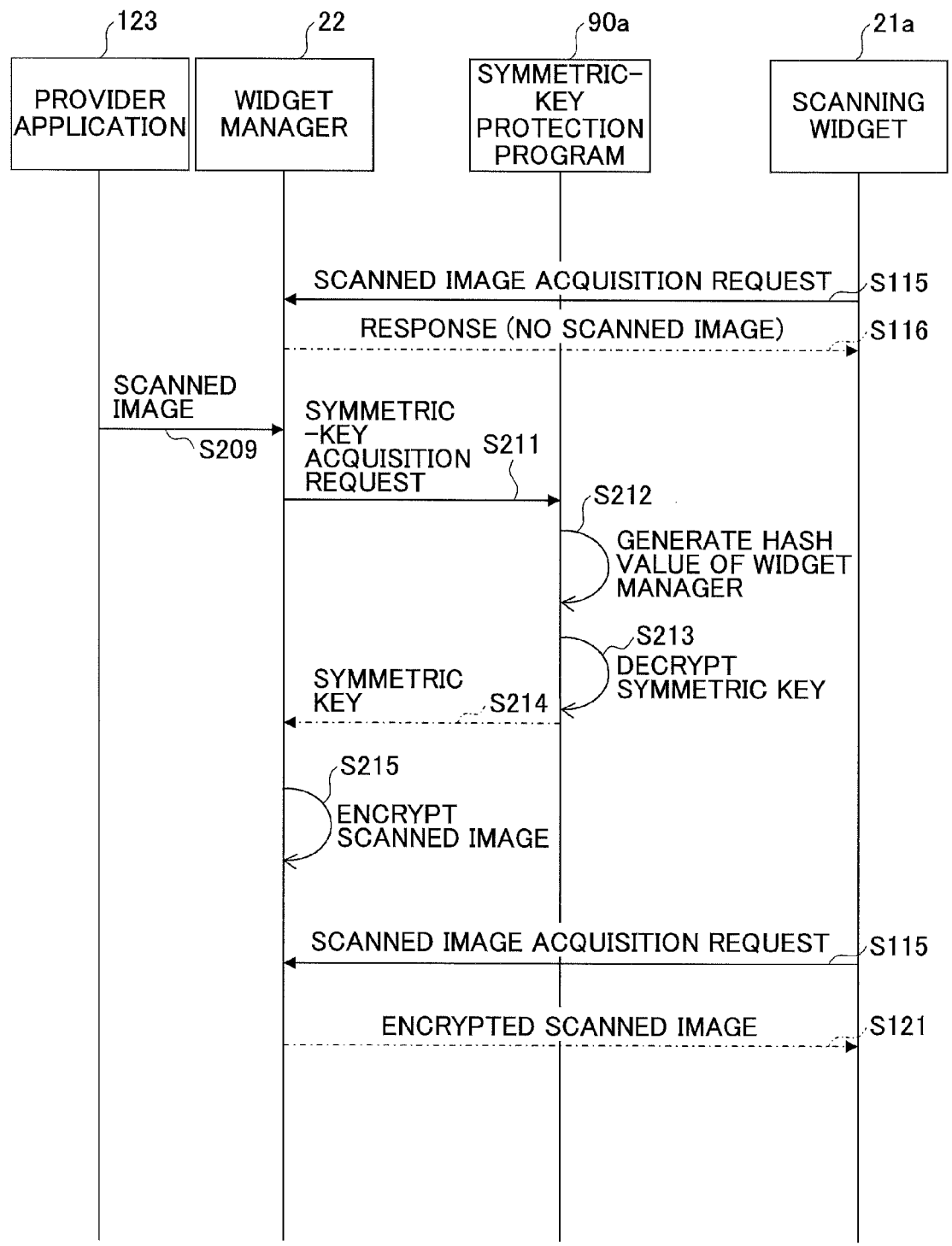
FIG. 17 is a sequence chart showing a process used to describe a first exemplary use of a symmetric-key protection program.

FIG. 17 is a sequence chart showing a process used to describe a first exemplary use of the symmetric-key protection program 90*a*. The process of FIG. 17 includes a part of the process of FIG. 13. The same reference numbers are assigned to the corresponding steps in FIGS. 13 and 17, and detailed descriptions of those steps are omitted.

When receiving a scanned image transmitted to the widget relay URL from the provider application 123 (S209), the relay unit 224 of the widget manager 22 calls a symmetric-key providing function 92*a* of the symmetric-key protection program 90*a* (S211). A hash value generating unit 921*a* of the symmetric-key providing function 92*a* generates a hash value of the program file of the widget manager 22 that has called the symmetric-key providing function 92*a* (S212). Then, a decryption unit 922*a* of the symmetric-key providing function 92*a* decrypts the encrypted symmetric key 91*a* using the generated hash value (S213). If the symmetric key 91*a* is successfully decrypted, the decryption unit 922*a* returns the decrypted symmetric key 91*a* to the widget manager 22 (S214).

Next, the relay unit 224 of the widget manager 22 encrypts the scanned image using the symmetric key 91*a* (S215). When receiving a scanned image acquisition request from the scanning widget 21*a* (S115), the relay unit 224 transfers the encrypted scanned image to the linkage unit 213 of the scanning widget 21*a* (S121).

Next, the scanning widget 21*a* transfers the encrypted scanned image to the image processing server 40. Then, the image processing server 40 decrypts the scanned image using the symmetric key 91*a* corresponding to the widget manager 22. Here, it is assumed that the symmetric key 91*a* of the widget manager 22 is stored in advance and safely managed in the image processing server 40. If the scanned image is successfully decrypted, the image processing server 40 determines that the scanned image is transmitted from an authentic sender and is not tampered with. Thus, the above configuration and process make it possible to effectively prevent impersonation of the widget manager 22 and eavesdropping of the scanned image transmitted via a network.

Although not shown in FIG. 13, the widget manager 22 may transfer logs of processes to the logging server 50. The symmetric-key protection program 90a may also be used to prove the authenticity of the sender of the logs.

Figure 18:
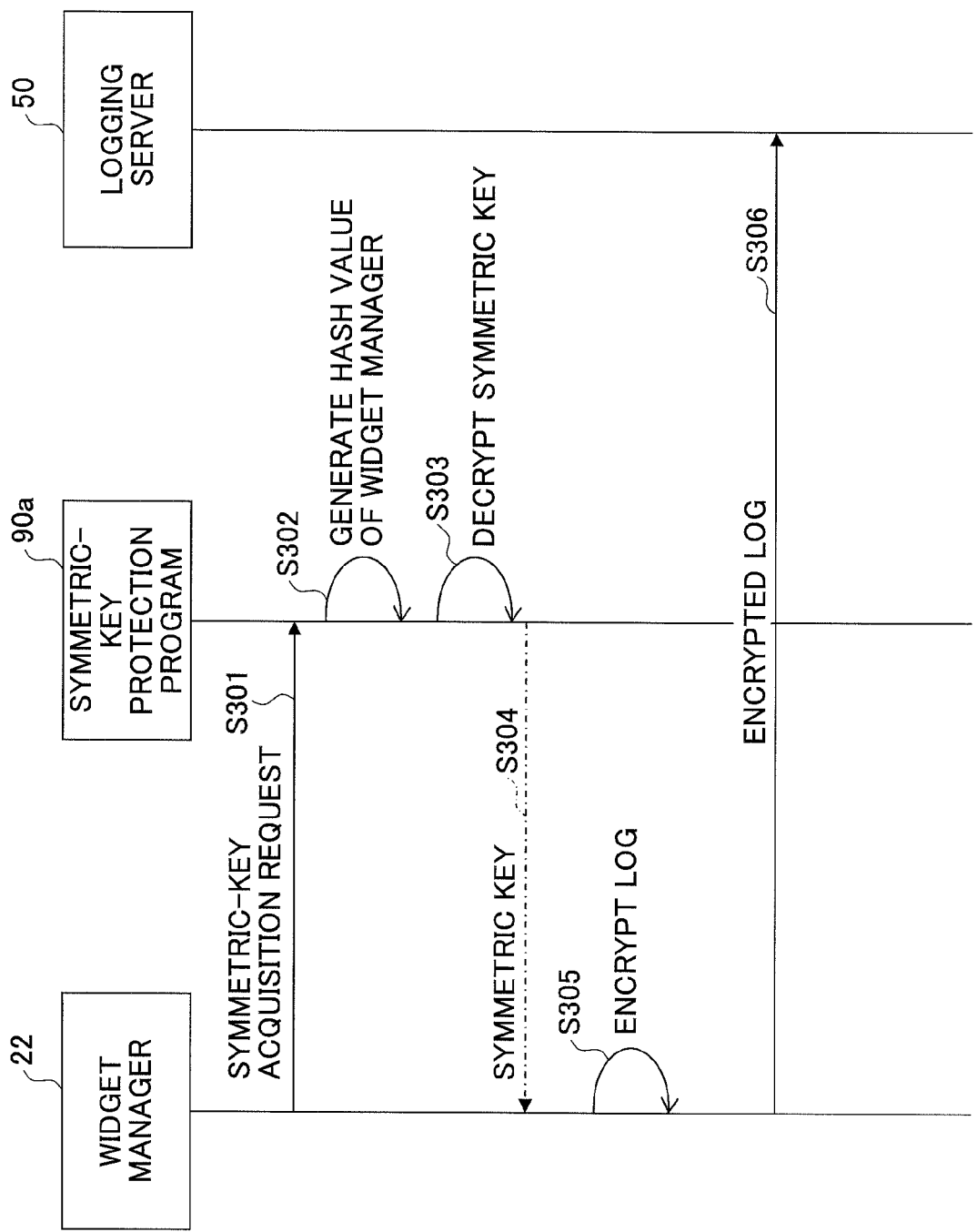
FIG. 18 is a sequence chart showing a process used to describe a second exemplary use of a symmetric-key protection program.

FIG. 18 is a sequence chart showing a process used to describe a second exemplary use of the symmetric-key protection program 90a.

When transferring a log, the log transfer unit 225 of the widget manager 22 calls the symmetric-key providing function 92a of the symmetric-key protection program 90a (S301). The hash value generating unit 921a of the symmetric-key providing function 92a generates a hash value of the program file of the widget manager 22 that has called the symmetric-key providing function 92a (S302). Then, the decryption unit 922a of the symmetric-key providing function 92a decrypts the encrypted symmetric key 91a using the generated hash value (S303). If the symmetric key 91a is successfully decrypted, the decryption unit 922a returns the decrypted symmetric key 91a to the widget manager 22 (S304).

Next, the log transfer unit 225 of the widget manager 22 encrypts the log using the symmetric key 91a (S305). Next, the log transfer unit 225 transfers the encrypted log to the logging server 50 (S306).

Then, the logging server 50 decrypts the log using the symmetric key 91a corresponding to the widget manager 22. Here, it is assumed that the symmetric key 91a of the widget manager 22 is stored in advance and safely managed in the logging server 50. If the log is successfully decrypted, the logging server 50 determines that the log is transmitted from an authentic sender and is not tampered with. Thus, the above configuration and process make it possible to effectively prevent impersonation of the widget manager 22 and eavesdropping of the log transmitted via a network.

In the exemplary processes of FIGS. 17 and 18, the image processing server 40 and the logging server 50 may include, instead of the symmetric key 91a, a decryption tool created by the provider of the widget manager 22. The decryption tool is a program for decrypting data encrypted using the symmetric key 91a of the widget manager 22. Using the decryption tool makes it possible to reduce the risk of leakage of the symmetric key 91a.

Also, a decryption server being operated by the provider of the widget manager 22 may be used to decrypt data encrypted using the symmetric key 91a of the widget manager 22. In this case, the image processing server 40 or the logging server 50 transmits the encrypted scanned image or log to the decryption server. The decryption server decrypts the scanned image or the log using the symmetric key 91a of the widget manager 22 or the decryption tool and returns the decrypted scanned image or log to the image processing server 40 or the logging server 50. The transmission of the scanned image or the log between the decryption server and the image processing server 40 or the logging server 50 is preferably performed using a secure communication protocol.

Next, a use of the symmetric-key protection program 90a in a process of updating the widget manager 22 is described.

Figure 19:
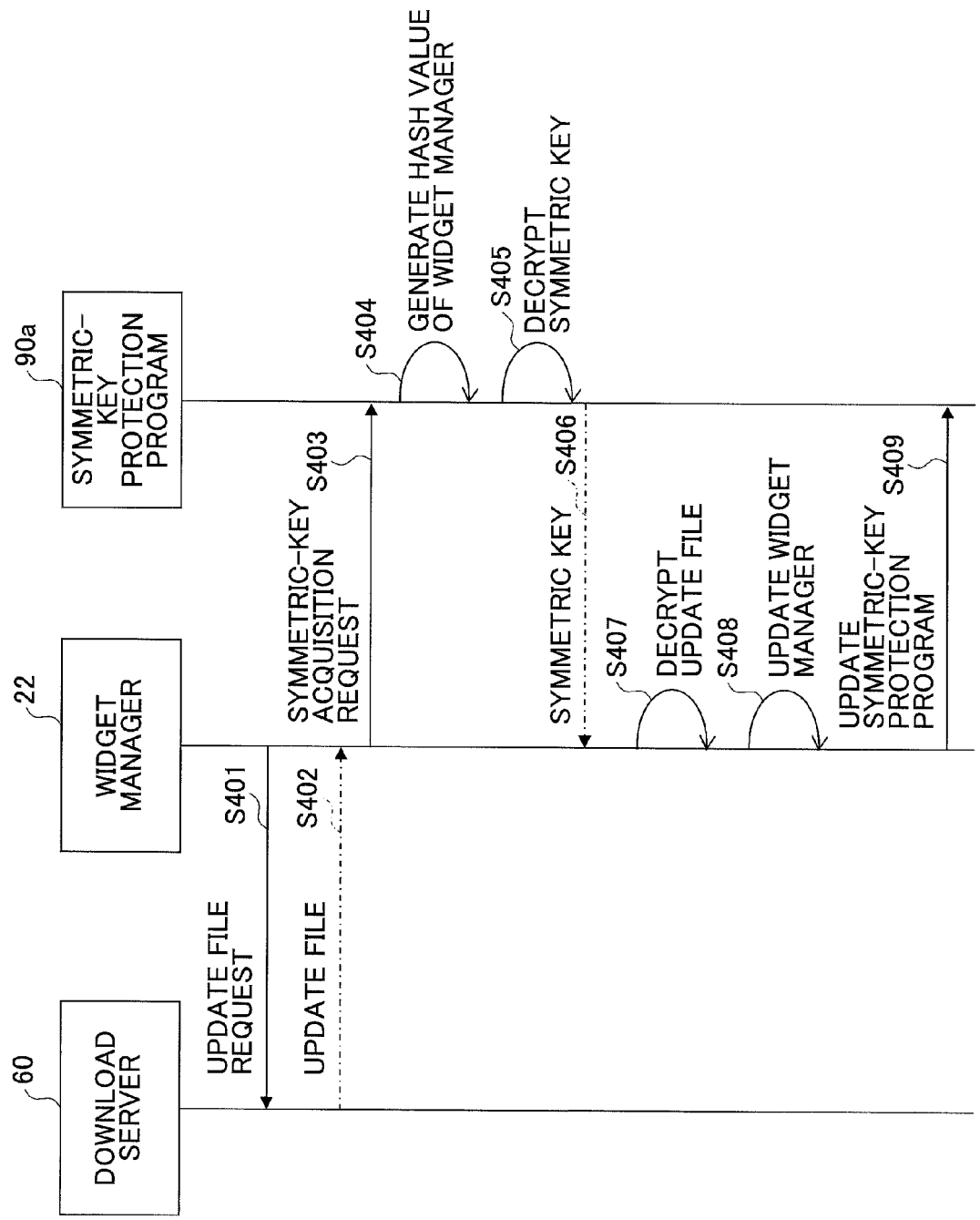
FIG. 19 is a sequence chart showing a process used to describe a third exemplary use of a symmetric-key protection program.

FIG. 19 is a sequence chart showing a process used to describe a third exemplary use of the symmetric-key protection program 90a.

The updating unit 226 of the widget manager 22 determines whether an update file is present by, for example, polling the download server 60 periodically (or sending an update file request) (S401). The update file includes an updated version of the widget manager 22. When the widget manager 22 is composed of multiple files and only some of the files are updated, the update file may include only the some of the files (i.e., differential files). The update file may also include the symmetric-key protection program 90a corresponding to the updated widget manager 22. Since the hash value of the updated widget manager 22 is different from the current widget manager 22, the symmetric-key protection program 90a in the update file contains the symmetric key 91a that is encrypted using the hash value of the updated widget manager 22. The update file may be encrypted using the symmetric key 91a of the current widget manager 22.

If the update file is present, the download server 60 transmits the update file to the updating unit 226.

When receiving the update file, the updating unit 226 calls the symmetric-key providing function 92a of the symmetric-key protection program 90a (S403). The hash value generating unit 921a of the symmetric-key providing function 92a generates a hash value of the program file of the widget manager 22 that has called the symmetric-key providing function 92a (S404). Then, the decryption unit 922a decrypts the encrypted symmetric key 91a using the generated hash value (S405). If the symmetric key 91a is successfully decrypted, the decryption unit 922a returns the decrypted symmetric key 91a to the widget manager 22 (S406).

Next, the updating unit 226 decrypts the update file using the symmetric key 91a (S407). If the update file is successfully decrypted, the updating unit 226 updates the widget manager 22 using the decrypted update file (S408). Then, the updating unit 226 updates (or replaces) the existing symmetric-key protection program 90a with a symmetric-key protection program 90a in the update file that corresponds to the updated widget manager 22 (S409).

This configuration or process enables the widget manager 22 to determine the authenticity of the sender of the update file. That is, if the update file is successfully decrypted using the symmetric key 91a, it indicates that the download server 60 is an authentic sender of the update file because only the authentic sender, i.e., the download server 60 can encrypt the update file using the symmetric key 91a. This configuration makes it possible to prevent the widget manager 22 from being updated using an unauthorized update file.

The above configuration also makes it possible to prevent alteration of the widget manager 22 by an unauthorized user. If a user alters the widget manager 22, the user cannot receive future updates (e.g., upgrades) for the widget manager 22 because the altered widget manager 22 is no longer able to obtain the symmetric key 91a used to decrypt update files. This makes it possible to prevent the user from altering the widget manager 22.

Figure 20:
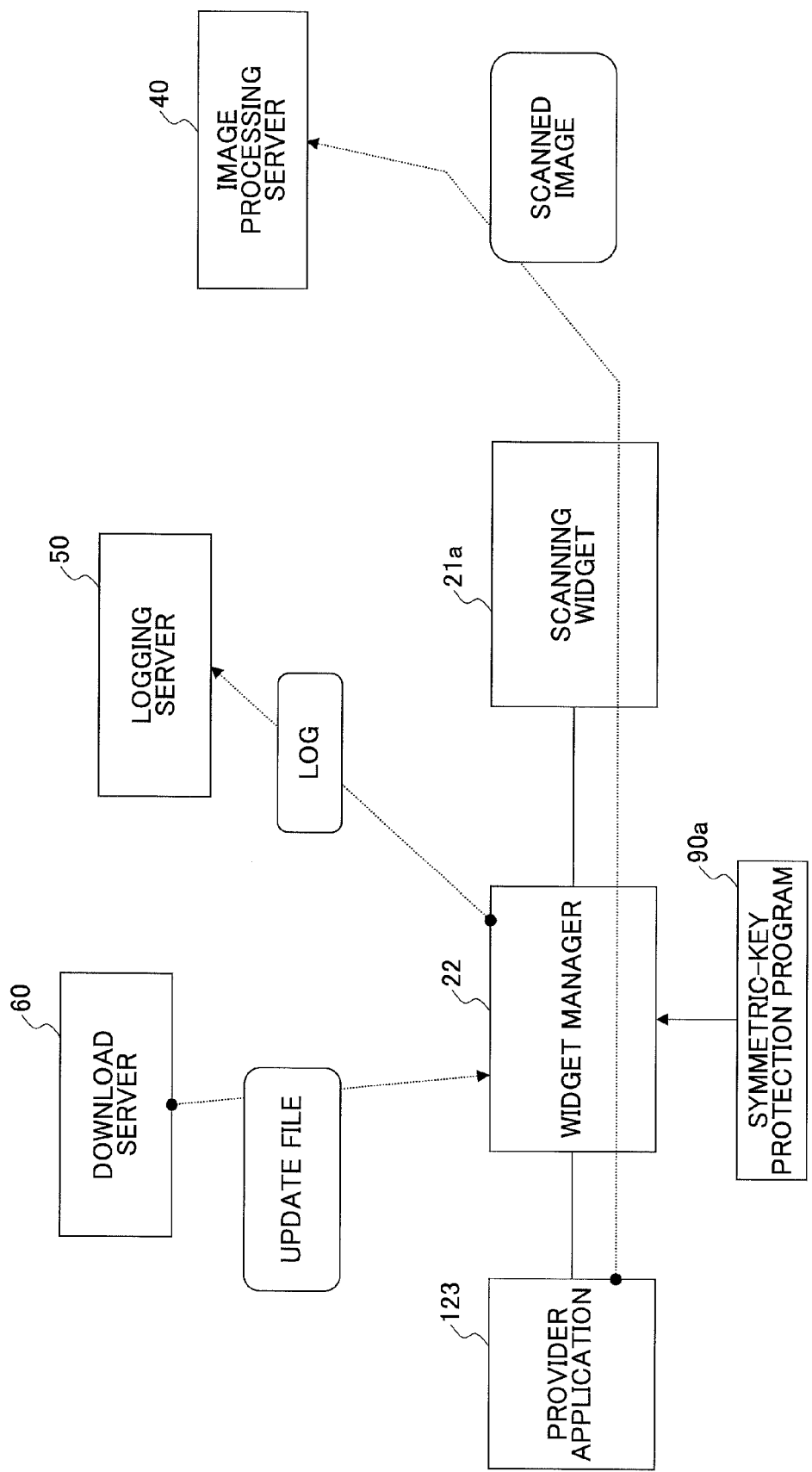
FIG. 20 is a drawing illustrating exemplary uses of a symmetric-key protection program.

FIG. 20 illustrates the first through third uses of the symmetric-key protection program 90a that are described above with reference to FIGS. 17 through 19.

In the information processing system 1 of this embodiment, communications between the provider application 123 and the scanning widget 21a are relayed by the widget manager 22. In other words, most of information transmitted in the information processing system 1 goes through the widget manager 22. For this reason, in the above embodiment, the symmetric-key protection program 90a is used (or called) by the widget manager 22 to efficiently assure the safety of information.

However, the symmetric-key protection program 90a may be used by any program other than the widget manager 22 such as the provider application 123 or the scanning widget 21a. Further, the symmetric-key protection program 90a may be provided for each appropriate program constituting the image forming apparatus 10 and/or the user terminal 20. For example, in the first exemplary use of FIG. 17, a symmetric-key protection program 90b for protecting a symmetric key 91b for the scanning widget 21a may be provided in the user terminal 20. In this case, instead of the symmetric key 91a obtained by the widget manager 22, the symmetric key 91b obtained by the scanning widget 21a from the symmetric-key protection program 90b may be used to encrypt the scanned image. Also in this case, the image processing server 40 may retain the symmetric key 91b and decrypt the scanned image transmitted from the scanning widget 21a by using the symmetric key 91b.

In another example, the symmetric-key protection program 90 may be provided for each of the provider application 123, the widget manager 22, and the scanning widget 21a so that information to be transmitted between them can be securely encrypted using the symmetric key 91.

In the above embodiment, the symmetric-key protection program 90 (90a, 90b) protects a symmetric key. However, the mechanism of the symmetric-key protection program 90 may be used to protect any other type of information. For example, any protected information the use of which is limited to a specific program may be encrypted using a hash value of the program and stored in a program module together with a protected information providing function that corresponds to the symmetric-key providing function 92 of the above embodiment.

Also, the protected information encrypted using the hash value of the program may not necessarily be stored in the program module where the protected information providing function is present. For example, the protected information may be stored in the program that uses the protected information, or location information (e.g., pathname) of the protected information may be known to the program. In this case, the protected information providing function may be configured to receive the encrypted protected information or the location information as an argument. When called by the program, the protected information providing function decrypts the protected information (which is, for example, identified by the argument) using the hash value of the program and returns the decrypted protected information.

Still, however, storing the encrypted protected information in the program module together with the protected information providing function is preferable to improve the security of the protected information. That is, compared with a case where the encrypted protected information is "exposed", storing the encrypted protected information in the program module makes it possible to reduce the risk of disclosing the protected information. Further, the protected information may be divided into parts according to a predetermined method and the parts of the protected information may be stored in the program module. In this case, the protected information providing function may be configured to combine the parts of the protected information through a process corresponding to the predetermined method and to decrypt the combined protected information.

As described above, the embodiments of the present invention provide an information protection apparatus, an information protection method, and a storage medium storing an information protection program that make it possible to securely and properly protect information.

The present invention is not limited to the specifically disclosed embodiments, and variations and modifications may be made without departing from the scope of the present invention.

What is claimed is:

1. An apparatus for protecting information, the apparatus comprising:
    a hash value generating unit configured to generate a second hash value of a program file that requests information encrypted using a first hash value of one of a plurality of program files; and
    a decryption unit configured to decrypt the information using the second hash value and if the information is successfully decrypted, to return the decrypted information to the requester program file,
    wherein the hash value generating unit is configured to obtain a pathname of the requester program file from a software program other than the requester program file and to identify the requester program file based on the obtained pathname.

2. The apparatus as claimed in claim 1, wherein the information is a symmetric key.

3. The apparatus as claimed in claim 2, wherein the symmetric key is configured to be used by the requester program file to encrypt information to be transmitted via a network.

4. The apparatus as claimed in claim 2, wherein the symmetric key is configured to be used by the requester program file to decrypt encrypted information received via a network.

5. The apparatus as claimed in claim 1, wherein
    the apparatus is configured to protect multiple sets of information for different applications; and
    the decryption unit is configured to try to decrypt each of the sets of information using the second hash value and to return one of the sets of information that is successfully decrypted.

6. The apparatus as claimed in claim 1, wherein
    the apparatus is configured to protect multiple sets of information that are stored in association with identifiers of different applications; and
    the decryption unit is configured to obtain an identifier of the requester program file and to decrypt and return one of the sets of information associated with the identifier of the requester program file.

7. A non-transitory computer-readable storage medium storing program code for causing a computer to perform a method for protecting information, the method comprising:
    generating a second hash value of a program file that requests information encrypted using a first hash value of one of a plurality of programs;
    obtaining a pathname of the requester program file from a software program other than the requester program file and identifying the requester program file based on the obtained pathname;
    decrypting the information using the second hash value; and
    if the information is successfully decrypted, returning the decrypted information to the requester program file.

8. The non-transitory computer-readable storage medium storing program code for causing a computer to perform a method for protecting information as claimed in claim 7, wherein the method further comprises preventing an unauthorized requester program file from directly submitting the pathname of the requester program file by actively identifying the requester program file by obtaining the pathname of the requester program file via a query to an operating system.

9. A method for protecting information performed by an information protection apparatus, the method comprising:
    generating a second hash value of a program file that requests information encrypted using a first hash value of one of a plurality of program files;

obtaining a pathname of the requester program file from a software program other than the requester program file and identifying the requester program file based on the obtained pathname;

decrypting the information using the second hash value; and if the information is successfully decrypted, returning the decrypted information to the requester program file.

10. The apparatus as claimed in claim 1, wherein the hash value generating unit is configured to prevent an unauthorized requester program file from directly submitting the pathname of the requester program file to the hash value generating unit by actively identifying the requester program file by obtaining the pathname of the requester program file via a query to an operating system.

11. The apparatus as claimed in claim 1, wherein the one of the plurality of program files is separate from the requester program file.

12. The method as claimed in claim 9, further comprising preventing an unauthorized requester program file from directly submitting the pathname of the requester program file by actively identifying the requester program file by obtaining the pathname of the requester program file via a query to an operating system.

* * * * *